(12) United States Patent
Kikkawa et al.

(10) Patent No.: US 7,523,214 B2
(45) Date of Patent: Apr. 21, 2009

(54) CONTENT PROVIDING SERVER, INFORMATION PROCESSING DEVICE AND METHOD, AND COMPUTER PROGRAM

(75) Inventors: Norifumi Kikkawa, Tokyo (JP); Tatsuya Igarashi, Tokyo (JP); Hiroyuki Mitsubori, Kanagawa (JP); Yoichi Kobori, Kanagawa (JP); Masaaki Hamada, Tokyo (JP)

(73) Assignee: Sony Corporation, Tokyo (JP)

( * ) Notice: Subject to any disclaimer, the term of this patent is extended or adjusted under 35 U.S.C. 154(b) by 241 days.

(21) Appl. No.: 10/552,147

(22) PCT Filed: Apr. 5, 2004

(86) PCT No.: PCT/JP2004/004916

§ 371 (c)(1),
(2), (4) Date: Oct. 7, 2005

(87) PCT Pub. No.: WO2004/090735

PCT Pub. Date: Oct. 21, 2004

(65) Prior Publication Data

US 2006/0242664 A1  Oct. 26, 2006

(30) Foreign Application Priority Data

Apr. 8, 2003 (JP) .............................. 2003-103716

(51) Int. Cl.
G06F 15/16 (2006.01)
(52) U.S. Cl. ....................................... 709/231; 709/230
(58) Field of Classification Search ................. 709/231, 709/1, 2, 3, 230, 249, 250, 217, 219, 227, 709/229; 725/37, 74, 82, 91, 143; 707/10
See application file for complete search history.

(56) References Cited

U.S. PATENT DOCUMENTS

| 6,473,903 | B2 * | 10/2002 | Balakrishnan et al. | 725/135 |
| 6,910,068 | B2 * | 6/2005 | Zintel et al. | 709/220 |
| 7,085,814 | B1 * | 8/2006 | Gandhi et al. | 709/208 |
| 2001/0056474 | A1 * | 12/2001 | Arai | 709/217 |

(Continued)

FOREIGN PATENT DOCUMENTS

JP 11-88279 3/1999

(Continued)

OTHER PUBLICATIONS

Intel Corporation, Overview of UPnP AV Architecture, Jul. 2, 2003, V1.00, pp. 1-9.*

(Continued)

Primary Examiner—John Follansbee
Assistant Examiner—Imad Hussain
(74) Attorney, Agent, or Firm—Finnegan, Henderson, Farabow, Garrett & Dunner, L.L.P.

(57) ABSTRACT

An apparatus and a method are proposed which enable an improved control processing for live streaming distribution of tuner received content from a server to a client. By setting a URL to a channel list as a set of channels, and transmitting a content acquisition request from the client to the server, wherein the channel list URL is designated, to a server, the client can collectively obtain rights to control all content on the channels listed in the channel list. By continuously using an HTTP connection set on the basis of a channel list, the client can switch channels.

29 Claims, 20 Drawing Sheets

U.S. PATENT DOCUMENTS

| | | | |
|---|---|---|---|
| 2002/0095359 A1 | 7/2002 | Mangetsu | |
| 2002/0129374 A1* | 9/2002 | Freeman et al. | 725/91 |
| 2003/0055995 A1* | 3/2003 | Ala-Honkola | 709/231 |
| 2003/0217163 A1* | 11/2003 | Lagerweij et al. | 709/229 |
| 2003/0229900 A1* | 12/2003 | Reisman | 725/87 |
| 2004/0236844 A1 | 11/2004 | Kocherlakota | |

FOREIGN PATENT DOCUMENTS

| | | |
|---|---|---|
| JP | 2001-92749 | 4/2001 |
| JP | 2002-084484 | 3/2002 |
| JP | 2002-140614 | 5/2002 |
| JP | 2002-189943 | 7/2002 |
| JP | 2002-312391 | 10/2002 |
| JP | 2002-354451 | 12/2002 |
| JP | 2003-50799 | 2/2003 |

OTHER PUBLICATIONS

Ritchie, John and Kuehnel, Thomas; UPnP AV Architecture:0.83, Jun. 12, 2002, pp. 1-22.*

Debique, Kirt et al. ContentDirectory:1 Service Template Version 1.01, Jun. 25, 2002, pp. 1-89.*

Fielding, R. et al. RFC 2616 Hypertext Transfer Protocol—HTTP/1.1, Jun. 1999, pp. 1 and 42-45.*

Dave Congon, Playing Audio on Your PPC From Your Desktop, Jul. 5, 2002, pp. 1-4.*

* cited by examiner

FIG. 4

| CONTENT No. | TITLE | ARTIST'S NAME | CHANNEL | CONTENT URL |
|---|---|---|---|---|
| 0001 | Abc‥ffg | Csde‥fddd | ‥ | http://1.2.‥ (VIDEO CAPSULE URL) |
| 0002 | | | | |
| 0003 | TERRESTRIAL CHANNEL LIST | | 1ch~12ch | http://1.2.‥ (CHANNEL LIST URL) |
| 0004 | SATELLITE BROADCAST CHANNEL LIST | | BS1ch ~CSnnch | http://5.6.‥ (CHANNEL LIST URL) |

```
<container id="ch-list" parentID="-1" restricted="1" ...>
<dc:title> TERRESTRIAL CHANNEL LIST </dc:title>
<upnp:class>object. container. function. avVideoTuner</upnp:class>
...
<av:allowedOperation>Play</av:allowedOperation>
<av:eventingURI>http://1.2.3.4:56000/SENA?id=live</av:eventingURI>
<res protocolInfo="http-get:*:video/mpeg:func-id=t01" av:codec="MPEG1V"...>   ← 491
http://1.2.3.4:5600/liveout Url
</res>                                                                        ← 492
</container>
```

FIG. 8B

```
<item id="ch8" parentID="dev0" restricted="1">
<dc:title>TOKYO TV </dc:title>
<upnp:class>object.item.videoItem.videoBroadcast.avChannel
</upnp:class>
<upnp:channelName>TOKYO TV<upnp:channelName>
<upnp:channelNr>8</upnp:channelNr>
...
</item>
```

FIG. 10

| CLIENT | CONNECTION ID | AVT INSTANCE ID | PROTOCOL INFORMATION |
|---|---|---|---|
| CLIENT A | 123aac33 | AB66ac33 | MPEG |
| CLIENT B | 253bed31 | CD54ed22 | internal:1.2.3.4:application/x-av-tuner-content:func-id=t01 |
| ... | ... | ... | ... |
| CLIENT N | 753bab55 | ED78ab21 | ATRAC |

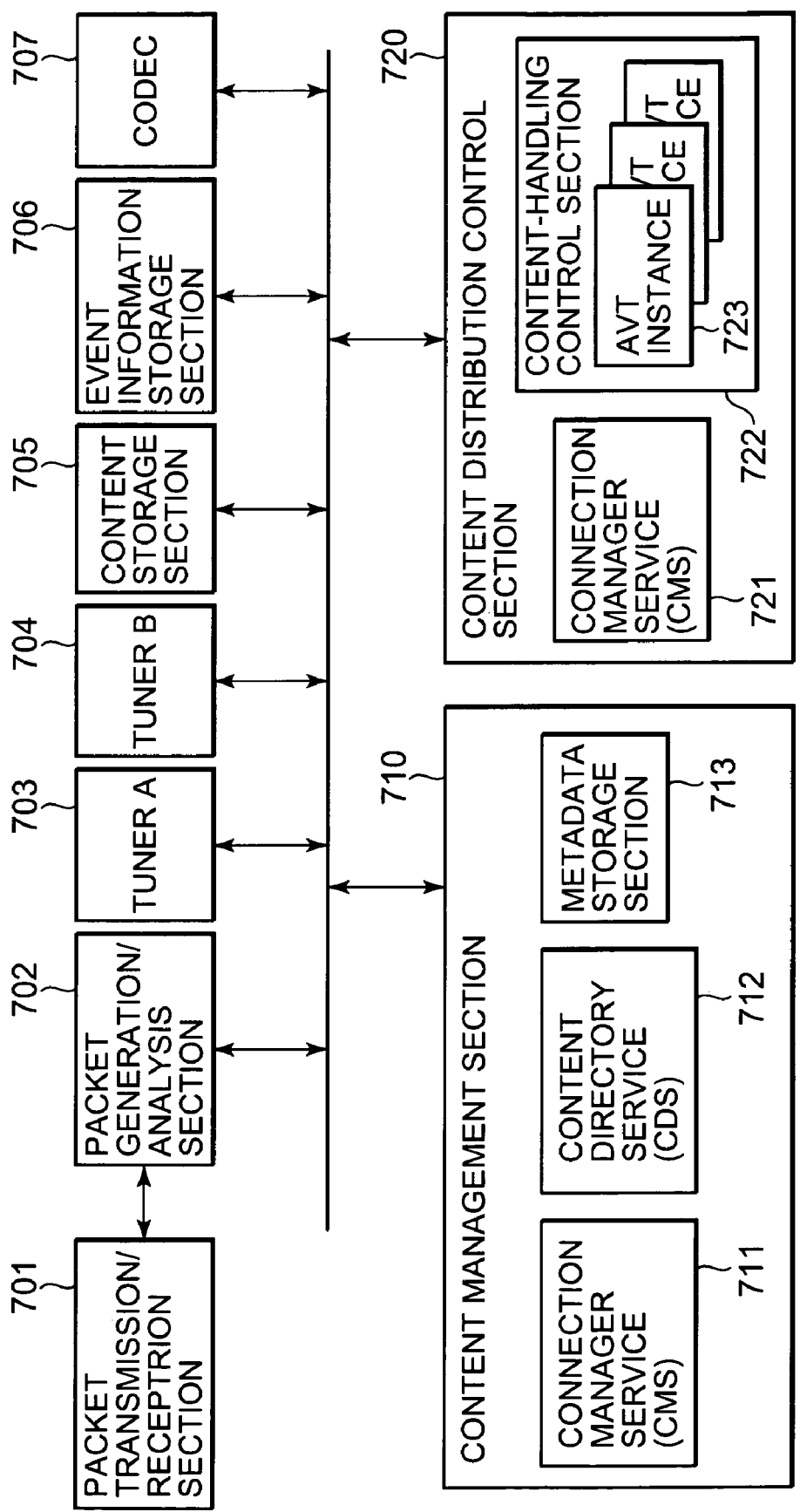

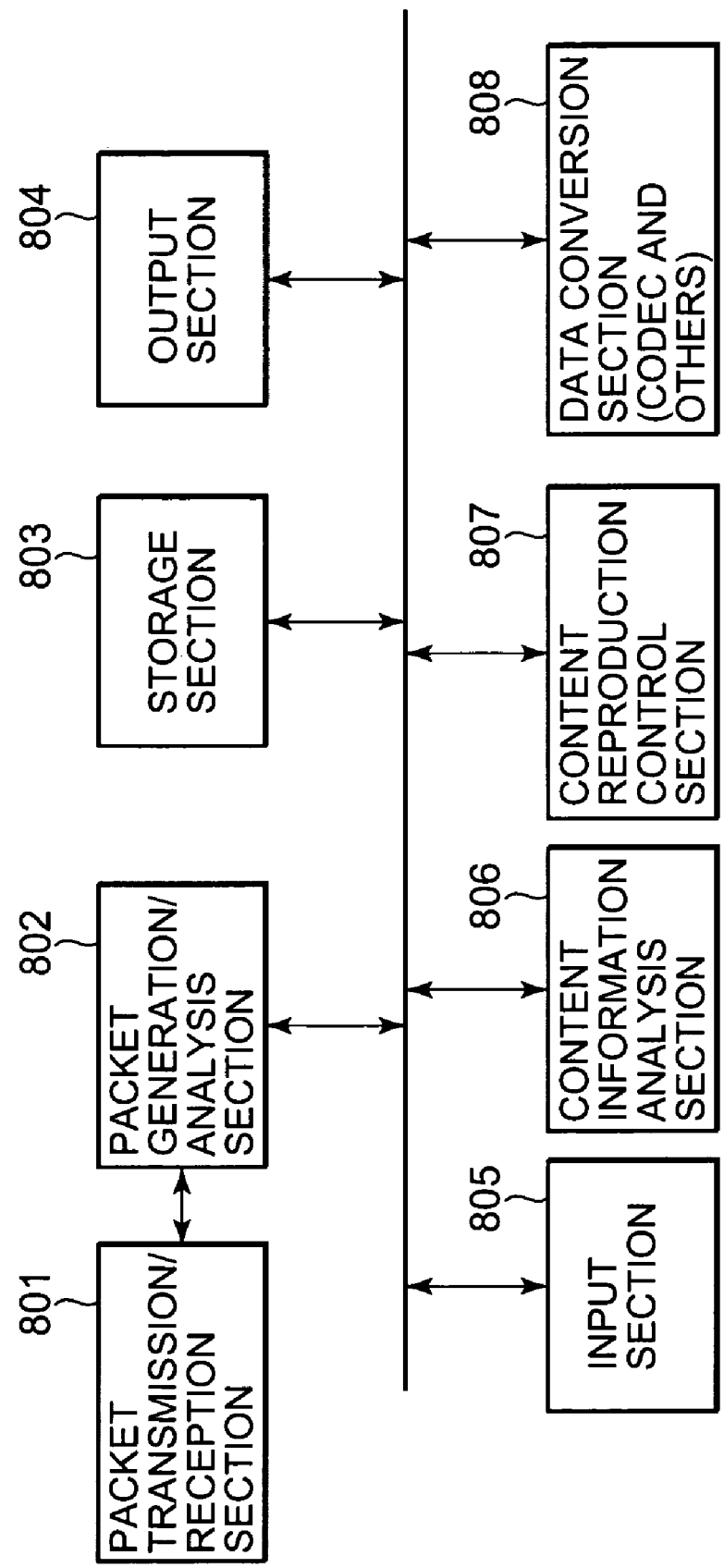

CONTENT PROVIDING SERVER, INFORMATION PROCESSING DEVICE AND METHOD, AND COMPUTER PROGRAM

CROSS REFERENCE TO RELATED APPLICATIONS

This application is a national phase application based on PCT/JP2004/004916, filed Apr. 5, 2004, the content of which is incorporated herein by reference, and claims the right to priority based on Japanese Application No. 2003-103716, filed Apr. 8, 2003, the content of which is incorporated herein by reference.

1. Technical Field

The present invention relates to a content priviiding server, an information processing apparatus and method, and a computer program. Particularly, the invention relates to a content providing server, an information processing apparatus an method, and a computer program, which are applied to processing of distributing and reproducing streaming data executed in a server/client system.

2. Background Art

As data communication networking prevails, so-called home networking, which enables home appliances, computers, and other peripherals to be networked together to implement communication therebetween even at home, is becoming prevalent. Home networking intends to allow networked equipment to share their data processing functions through communication between themselves. It intends to provide users with convenience/comfort in operation, such as content transmission/reception between the networked equipment, and it is predicted to become more and more prevalent in the future.

As a protocol suitable for such a home networking configuration, UPnP (registered trademark) is known. UPnP can construct a network easily without involving complicated operation, and is thus intended such that networked equipment can receive services provided by other networked equipment without involving difficult operation and setting. Further, UPnP has an advantage that it is not dependent on an OS (Operating System) on a device so that it can implement easy addition of equipment.

UPnP exchanges definition files compliant with XML (eXtensible Markup Language) between the networked equipment to perform mutual recognition between the equipment. An outline of UPnP-based processing is as follows.

(1) An addressing process of acquiring its own device ID such as an IP address.

(2) A discovery process of searching devices on the network, receiving a response from each of the devices, and acquiring information, such as device type, function, contained in the response.

(3) A service requesting process of requesting a service to each of the devices on the basis of the information acquired in the discovery process.

By performing the above-mentioned processing procedure, the provision and reception of services to which the networked equipment is applied can be implemented. Equipment to be newly networked acquires a device ID through the above-mentioned addressing process, and acquires information about the other networked devices through the discovery process, whereby it can request services to the other equipment on the basis of the acquired information.

For example, where content such as music data, image data stored on a server is to be reproduced by a client-side device, the client acquires information about the content held by the server. The server stores attribute information including information regarding content stored in a storage section thereof and various content to be received from the outside via a tuner, in the storage section thereof, and provides the client with such information. The attribute information includes various information, such as information regarding, e.g., titles of, e.g., tunes or pictures as content, artist names, recording dates/times, and further data compression modes. These pieces of attribute information are called "metadata" or "meta-information".

The client can make a request to the server for acquiring various attribute information about the content stored on the server, such as, e.g., titles of tunes or pictures, artist names, and further data compression mode information (ATRAC (adaptive transform acoustic coding), MPEG (moving picture experts group), and the like), and further copyright information, as necessary.

The server transmits the metadata (attribute information) about the content it holds, to the client according to the request from the client. The client displays content information on a display of its device according to a predetermined display program on the basis of the metadata acquired from the server. For example, a music program list containing artist names, titles, and the like is displayed on the display. A user checks or selects content for reproduction on the basis of the displayed information, and transmits a request for transmitting the content, to the server. The server receives the content request from the client, transmits the content to the client according to the received request, and the received content is reproduced on the client side.

In this way, content stored on the server can be reproduced when other equipment (clients) networked to the server search through the content, and designate specific content.

Further, a server configuration having a so-called live streaming data distribution configuration has been proposed, in which a server that provides content is additionally equipped with a tuner function to transmit video or audio data received via the tuner to a client. The configuration is such that, e.g., various types of broadcast data, such as by terrestrial broadcasting, satellite broadcasting, is received by a tuner within a home server, and the received data is transmitted from the server to a client, e.g., a PC having no tuner, whereby a user views or listens to various programs, such as TV programs, radio programs, via a display, speakers provided with the PC.

A system, in which a client remotely controls a server to receive television data with a tuner within the server, and reproduces the received television data via a local area network on the client side, is disclosed in, e.g., Patent Document 1 (Japanese Patent Application Publication No. 2002-84484).

However, the configuration disclosed in Patent Document 1 is to store data received by the tuner within the server in a storage means within the server, e.g., a HDD, and provides this stored data to the client. Thus, this system realizes so-called virtual live streaming in which a process similar to the providing of content stored on a server to a client is executed on tuner-received data.

A process to be performed where a client acquires specific content from a server involves the client transmitting a content identifier to the server, and the server acquiring and then transmitting the designated content on the basis of the identifier received from the client.

For example, the server holds content URLs (Uniform Resource Locators) associated with content as content-corresponding metadata, and the client generates a GET method supported by HTTP (HyperText Transfer Protocol) wherein a content URL is designated, for transmission to the server, whereby the server can transmit the content specified on the basis of the received URL, to the client.

Assuming a configuration in which data received via the tuner is transmitted to the client from the server on the basis of URL designation similar to what has been mentioned above, the server must set many URLs corresponding to data on many channels to be received via the tuner, and the client must transmit a content request wherein a URL corresponding to each of the channels is designated, to the server.

However, such a channel-based URL setting configuration requires that the client wishing to switch channels transmit anew an HTTP-GET method wherein a URL corresponding to a channel to be tuned to after the switching is set, to the server. Therefore, between the server and the client, a connection based on a URL set before the switching is invalidated, and then a connection based on a new URL is set anew, to perform distribution of streaming data from the channel tuned to after the switching on the basis of the connection set anew after the switching.

In this way, in the case of the channel-based URL setting configuration, the client must perform setting of a connection between the server and the client every time channels are to be switched, thus giving overload to both. Further, communication is interrupted-every time channels are switched, and thus there is a problem that a smooth processing environment such as channel switching using a typical television remote controller cannot be obtained.

Furthermore, in an environment in which a plurality of clients are receiving the same program from a single server for viewing by a plurality of users, there occurs another problem that the program is interrupted every time any of the users switches channels.

DISCLOSURE OF THE INVENTION

The present invention has been made in view of the above-mentioned problems, and has an object to provide a content providing server, an information processing apparatus and method, and a computer program which enable a client to smoothly and efficiently execute control over a server, whereby, e.g., even where streaming data received via a tuner of the server is provided to the client and the client executes control such as channel switching, distribution of the streaming data can be executed continuously without interrupting communication, between the server and the client.

A first aspect of the present invention is a content providing server that executes a content transmission process to a client, characterized by having:

a tuner that executes a data reception process;

a data transmission/reception section that executes a communication process between the server and the client for received content by the above-mentioned tuner and control information;

a storage section having attribute information corresponding to content as content information;

a content management section that executes a process of providing the above-mentioned content information to a plurality of clients; and a content distribution control section that executes live streaming distribution control to a client of the received content via the above-mentioned tuner, wherein the above-mentioned storage section is configured to store a channel list identifier as identification information about a channel list containing at least a plurality of channels of received channels by the above-mentioned tuner, as content information corresponding to tuner-received content, and wherein the above-mentioned content distribution control section is configured to set a plurality of tuner-received content corresponding to the plurality of channels described in the above-mentioned channel list as a single unit of controlled content, to execute control over content for distribution corresponding to the plurality of channels described in the above-mentioned channel list on the basis of a control request corresponding to the channel list identifier received from the client.

Furthermore, in an embodiment of the content providing server of the present invention, the above-mentioned channel list identifier is characterized by being a channel list URL (Uniform Resource Locator), and the above-mentioned storage section is characterized by being configured to store the above-mentioned channel list URL as attribute information corresponding to the above-mentioned tuner-received content, and the above-mentioned content distribution control section is characterized by being configured to execute distribution control over the content on the plurality of channels received by the above-mentioned tuner specified on the basis of the above-mentioned channel list URL according to the control request from the client.

Furthermore, in an embodiment of the content providing server of the present invention, the above-mentioned channel list identifier is characterized by being a channel list URL (Uniform Resource Locator), and a connection for distribution of the tuner-received content between the server and the client is characterized by being an HTTP (HyperText Transport Protocol) connection set on the basis of the above-mentioned channel list URL, wherein the above-mentioned content distribution control section is characterized by being configured to execute content distribution which continuously uses the HTTP connection set on the basis of the above-mentioned channel list URL, before and after channel switching executed as switching of the plurality of tuner-received content corresponding to the plurality of channels described in the above-mentioned channel list.

Furthermore, in an embodiment of the content providing server of the present invention, the above-mentioned content information is characterized by containing content-corresponding protocol information, and protocol information set so as to correspond to the received content via the above-mentioned tuner is characterized by containing a function ID as tuner identification information, wherein the above-mentioned content distribution control section is characterized by being configured to execute a process of setting a control instance that executes control over the tuner-received content as a control instance that executes control over a tuner for control which is determined on the basis of the above-mentioned function ID.

Furthermore, in an embodiment of the content providing server of the present invention, the above-mentioned content distribution control section is characterized by being configured to set a control instance that executes content distribution control over each content for distribution, to execute content-based distribution control which is based on the control instance, and a tuner control instance that executes control over the above-mentioned tuner-received content is characterized by being configured to execute control over the above-mentioned tuner on the basis of the control request from the client.

Furthermore, in an embodiment of the content providing server of the present invention, the above-mentioned content distribution control section is characterized by being configured to set a control instance that executes content distribution control over each content for distribution, to execute content-based distribution control which is based on the control instance, and execute connection management which is based on a connection management table in which an instance ID as an identifier of the above-mentioned control instance, a connection ID as a connection identifier between the server and the client, and protocol information corresponding to the content for distribution are associated with each other.

Furthermore, in an embodiment of the content providing server of the present invention, the above-mentioned content distribution control section is characterized by being configured to set a control instance that executes content distribution control over each content for distribution, to execute content-based distribution control which is based on the control instance, wherein the above-mentioned control instance is characterized by being configured to have an instance ID set as an identifier, and execute the content distribution control according to a control request from the client wherein the control instance ID is designated.

Furthermore, in an embodiment of the content providing server of the present invention, the above-mentioned content distribution control section is characterized by being configured to receive a control request for content for distribution which is compliant with a SOAP (Simple Object Access Protocol) from the client, and execute distribution control over the tuner-received content on the basis of the above-mentioned control request.

Furthermore, in an embodiment of the content providing server of the present invention, the above-mentioned channel list is characterized by being configured to be set as a list formed from the plurality of channels divided according to categories.

Furthermore, in an embodiment of the content providing server of the present invention, the above-mentioned content distribution control section is characterized by being configured to execute, during execution of distribution control over content on the plurality of channels received by the above-mentioned tuner specified on the basis of a channel list URL as the identifier of the above-mentioned channel list, distribution of the tuner-received content specified on the basis of the channel list URL, in response to an HTTP-GET method received as a content request from another client wherein the same channel list URL is designated, through an HTTP connection which is based on the above-mentioned channel list URL.

Furthermore, in an embodiment of the content providing server of the present invention, the above-mentioned channel list identifier is characterized by being a channel URL (Uniform Resource Locator), and a connection for distribution of the tuner-received content between the server and the client is characterized by being an HTTP (HyperText Transfer Protocol) connection set on the basis of the above-mentioned channel list URL, wherein the above-mentioned content distribution control section is characterized by being configured to determine whether or not matching of coded data for transmission to the client can be maintained even when the plurality of channels described in the above-mentioned channel list has been switched, and execute breakage of the HTTP connection set on the basis of the above-mentioned channel list URL where it is determined that the matching cannot be maintained, and wherein the above-mentioned content providing server is characterized by being configured to further execute a process of notifying breakage information about the HTTP connection set on the basis of the channel list URL, via an event notification connection between the server and the client.

Furthermore, in an embodiment of the content providing server of the present invention, the above-mentioned channel list identifier is characterized by being a channel list URL (Uniform Resource Locator), and a connection for distribution of the tuner-received content between the server and the client is characterized by being an HTTP (HyperText Transport Protocol) connection set on the basis of the above-mentioned channel list URL, wherein the above-mentioned content distribution control section is characterized by being configured to execute switching of a plurality of channels described in the above-mentioned channel list by tuner control at a timing when matching of coded data for transmission to the client can be maintained.

Furthermore, a second aspect of the present invention is an information processing apparatus that receives received content by a tuner set to a server, from the server, characterized by having:

a data transmission/reception section that executes data transmission/reception process with respect to the server that provides tuner-received content;

a control section that transmits a content transmission request which is based on a channel list identifier which is an identifier of a list containing at least a plurality of channels of received channels by the above-mentioned tuner, to the above-mentioned server, and also executes a process of transmitting distribution control request for tuner-received content wherein a control instance that executes content distribution control is designated in the above-mentioned server.

Furthermore, in an embodiment of the information processing apparatus of the present invention, the above-mentioned control section is characterized by being configured to transmit a connection preparation request wherein a function ID as tuner identification information which is a piece of protocol information contained in content information received from the above-mentioned server is stored, to the above-mentioned server, and acquire an ID of a control instance that executes control over the tuner-received content, received from the above-mentioned server, to execute a process of transmitting the distribution control request for the tuner-received content wherein the above-mentioned control instance ID is designated, as a response to the above-mentioned connection preparation request.

Furthermore, in an embodiment of the information processing apparatus of the present invention, the above-mentioned channel list identifier is characterized by being a channel list URL (Uniform Resource Locator), and a connection for distribution of tuner-received content between the server and the client is characterized by being an HTTP (HyperText Transport Protocol), connection set on the basis of the above-mentioned channel list URL, wherein the above-mentioned control section is characterized by being configured to execute content reception before and after switching of the plurality of channels described in the above-mentioned channel list by continuously using the HTTP connection set on the basis of the above-mentioned channel list URL.

Furthermore, a third aspect of the present invention is a content transmission control method for transmitting received content by a tuner set to a content providing server, to a client, characterized by having:

a control instance setting step of setting a control instance wherein tuner-received content corresponding to a plurality of channels described in a channel list containing at least the plurality of channels of received channels by the above-mentioned tuner is set, as a unit of content for control;

a control request reception step of receiving a control request to the above-mentioned control instance from the client; and a control step of executing tuner control by the above-mentioned control instance on the basis of the above-mentioned control request.

Furthermore, in an embodiment of the content transmission control method of the present invention, a channel list identifier is characterized by being a channel list URL (Uniform Resource Locator), wherein the above-mentioned control instance setting step is characterized by including a step of associating the above-mentioned channel list URL with the control instance. Furthermore, in an embodiment of the content transmission control method of the present invention, the above-mentioned channel list identifier is characterized by being a channel list URL (Uniform Resource Locator), and a connection for distribution of tuner-received content between the server and the client is characterized by being an HTTP (HyperText Transfer Protocol) connection set on the basis of the above-mentioned channel list URL, wherein the above-mentioned control step is characterized by executing content distribution which continuously uses the HTTP connection set on the basis of the above-mentioned channel list URL, before and after channel switching executed as switching of the plurality of tuner-received content corresponding to the plurality of channels described in the above-mentioned channel list.

Furthermore, in an embodiment of the content transmission control method of the present invention, a content information is characterized by containing protocol information corresponding to content, and the protocol information set so as to correspond to the received content via the above-mentioned tuner is characterized by containing a function ID as tuner identification information, wherein the above-mentioned control instance setting step is characterized by executing a process of setting a control instance that executes control over the tuner-received content as a control instance that executes control over a tuner for control which is determined on the basis of the above-mentioned function ID.

Furthermore, in an embodiment of the content transmission control method of the present invention, the above-mentioned content transmission control method is characterized by further including a step of executing connection management which is based on a connection management table in which an instance ID which is an identifier of the above-mentioned control instance, a connection ID which is a connection identifier between the server and the client, and protocol information corresponding to content for distribution are associated with each other.

Furthermore, in an embodiment of the content transmission control method of the present invention, the above-mentioned control request reception step is characterized as being a step of receiving a control request for content for distribution compliant with a SOAP (Simple Object Access Protocol), from the client.

Furthermore, in an embodiment of the content transmission control method of the present invention, the above-mentioned content transmission control method is characterized by further including a step of executing, during execution of distribution control over content on the plurality of channels received by the above-mentioned tuner specified on the basis of a channel list URL as a channel list identifier, distribution of the tuner-received content specified on the basis of the channel list URL, in response to an HTTP-GET method received as a content request from another client wherein the same channel list URL is designated, through an HTTP connection which is based on the above-mentioned channel list URL.

Furthermore, in an embodiment of the content transmission control method of the present invention, a channel list identifier is characterized by being a channel list URL (Uniform Resource Locator), and a connection for distribution for tuner-received content is characterized by being an HTTP (HyperText Transfer Protocol) connection set on the basis of the above-mentioned channel list URL, wherein the above-mentioned content transmission control method is characterized by further including:

a step of determining whether or not matching of coded data for transmission to the client can be maintained even when the plurality of channels described in the above-mentioned channel list has been switched, and executing breakage of the HTTP connection set on the basis of the above-mentioned channel list URL where it is determined that the matching cannot be maintained; and a step of executing a process of notifying breakage information about the HTTP connection set on the basis of the channel list URL, via an event notification connection between the server and the client.

Furthermore, in an embodiment of the content transmission control method of the present invention, a channel list identifier is characterized by being a channel list URL (Uniform Resource Locator), and a connection for distribution of the tuner-received content is characterized by being an HTTP (HyperText Transfer Protocol) connection set on the basis of the above-mentioned channel list URL, wherein the above-mentioned control step is characterized by further including a step of executing switching of the plurality of channels described in the above-mentioned channel list by tuner control at a timing when matching of coded data for transmission to the client can be maintained.

Furthermore, a fourth aspect of the present invention is an information processing method for receiving received content by a tuner set to a server, from the server, characterized by having:

a content transmission requesting step of transmitting a content transmission request which is based on a channel list identifier, which is an identifier of a list containing at least a plurality of channels of received channels by the above-mentioned tuner; and a control requesting step of executing a process of transmitting a distribution control request for tuner-received content wherein a control instance that executes control over content distribution in the above-mentioned server, is designated.

Furthermore, in an embodiment of the information processing method of the present invention, the above-mentioned content transmission request step is characterized by including a step of transmitting a connection preparation request wherein a function ID as tuner identification information which is a piece of protocol information contained in content information received from the above-mentioned server, is stored, to the above-mentioned server, wherein the above-mentioned control request step is characterized by including a step of executing a process of transmitting a distribution control request for tuner-received content wherein an ID of a control instance that executes control over tuner-received content received from the above-mentioned server is designated, as a response to the above-mentioned connection preparation request.

Furthermore, in an embodiment of the information processing method of the present invention, the above-mentioned channel list identifier is characterized by being a channel list URL (Uniform Resource Locator), and a connection for distribution of tuner-received content is characterized by being an HTTP (HyperText Transfer Protocol) connection set on the basis of the above-mentioned channel list URL, wherein the above-mentioned information processing method is characterized by executing content reception before and after channel switching executed as switching of a plurality of channels described in the above-mentioned channel list, continuously using the HTTP connection set on the basis of the above-mentioned channel list URL.

Furthermore, a fifth aspect of the present invention is a computer program that executes a content transmission control process for transmitting received content by a tuner set to a content providing server, to a client, characterized by having:

a control instance setting step of setting a control instance wherein tuner-received content corresponding to a plurality of channels described in a channel list containing at least the plurality of channels of received channels by the above-mentioned tuner, as a unit of content for control;

a control request receiving step of receiving a control request to the above-mentioned control instance from a client; and a control step of executing tuner control by the above-mentioned control instance on the basis of the above-mentioned control request.

Furthermore, a sixth aspect of the present invention is a computer program that executes an information processing process for receiving received content by a tuner set to a server, from the server, characterized by having:

a content transmission requesting step of transmitting a content transmission request which is based on a channel list identifier, which is an identifier of a list containing at least a plurality of channels of received channels by the above-mentioned tuner; and a control requesting step of executing a process of transmitting a distribution control request for tuner-received content wherein a control instance that executes control over content distribution in the above-mentioned server, is designated.

According to the configuration of the present invention, it is configured to set a URL to a channel list as a set of channels, and thus a client transmits a content acquisition request wherein the channel list URL is designated, to a server, the client can collectively obtain rights to control all content on the channels listed in the channel list, i.e., channel items set below a tuner container in a content management directory. As a result, when channels listed in the channel list are to be switched, there is no need to make a content request which is based on a new URL.

Further, in the configuration of the present invention, content distribution which continuously uses an HTTP connection set on the basis of a channel list can be executed before and after channel switching executed as switching of a plurality of tuner-received content corresponding to a plurality of channels described in the channel list. Therefore, the client can switch channels only by transmitting a control instruction, such as a channel switching instruction, to the content distribution control section. Consequently, processing, such as re-setting of the connection between the server and the client which is based on switching of new/old URLs, is no longer required. That is, when channels in the channel list are to be switched, content can be received before and after the channel switching, while continuously using the HTTP connection as a content distribution connection, only by performing a channel switching request (AVT Seek action) to an AVT instance.

Furthermore, in the configuration of the present invention, where an HTTP-GET method as a content request from another client wherein the same channel list URL is designated is received during execution of distribution control over content of a plurality of channels received by a tuner specified on the basis of a channel list URL as an identifier of a channel list under the control of an AVT instance, that requesting client can execute distribution of tuner-received content specified on the basis of the channel list URL, through an HTTP connection which is based on the channel list URL, without setting an AVT instance.

Note that the computer program of the present invention is a computer program that can be provided by a storage medium, a communication medium, e.g., a storage medium such as a CD or a FD, a MO, or a communication medium such as a network, provided in a computer-readable form to, e.g., a general-purpose computer system that can execute various program codes. By providing such a program in a computer-readable form, processing according to the program is realized on the computer system.

Other objects, features, and advantages of the present invention will become apparent from a more detailed description that is based on a later-described embodiment thereof and accompanying drawings. Note that a system used in the present description means a logical set configuration of a plurality of apparatus, and is not limited to one wherein apparatus each having its own configuration are grouped within the same enclosure.

BRIEF DESCRIPTION OF DRAWINGS

FIG. 4 is a diagram showing an example display of content information.

FIG. 8 is a diagram explaining content information corresponding to the tuner container and a channel item.

FIG. 10 is a diagram explaining configuration data of a connection management table held by the server that executes the streaming distribution process on tuner-received data.

FIG. 19 is a block diagram explaining processing functions of the server.

FIG. 20 is a block diagram explaining processing functions of the client.

BEST MODES FOR CARRYING OUT THE INVENTION

Details of a content providing server, an information processing apparatus and method, and a computer program of the present invention will hereinafter be described with reference to the drawings.

[Outline of the System]

Figure 1:
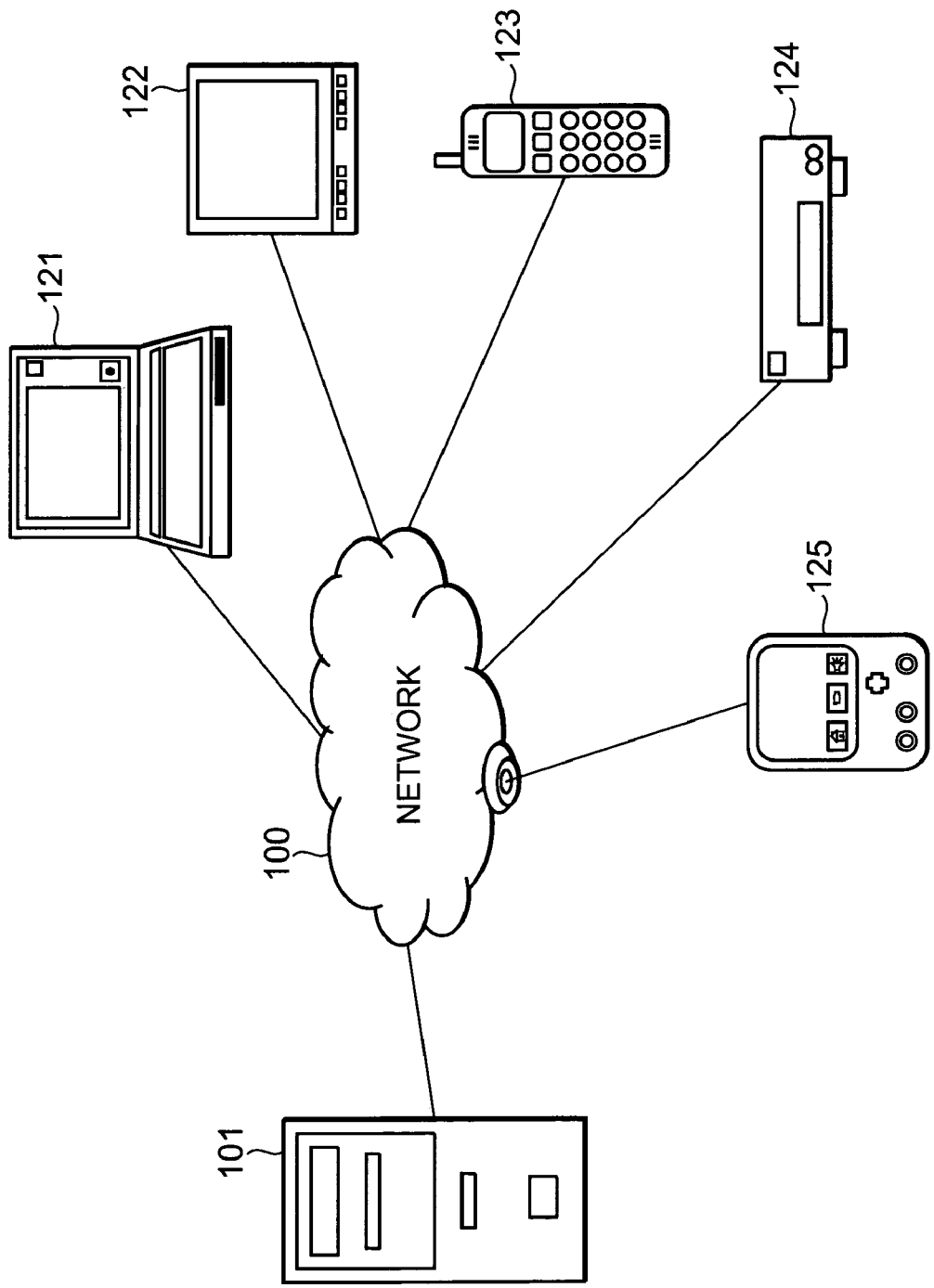
FIG. 1 is a diagram showing an example configuration of a network to which the present invention is applicable.

Referring first to FIG. 1, an example configuration of a network to which the present invention is applicable will be described. FIG. 1 shows a configuration, e.g., a home networking configuration, in which a server 101 as a content distribution apparatus that executes processing according to processing requests from various client apparatus, and clients as content reception apparatus that make the processing requests to the server 101 are connected via a network 100. As the client apparatus, a personal computer (PC) 121, a monitor 122, a portable telephone 123, a player 124, a PDA (Personal Digital Assistant) 125 are shown as examples. However, other electronic equipment, home appliances are also connectable as the client apparatus.

The processing executed by the server 101 according to requests from the clients includes, e.g., providing content stored in a storage means such as a hard disk held by the server 101, or content distribution services for forwarding live content received via a tuner held by the server 101, to the clients. While the server 101 is shown as being distinguished from the client apparatus in FIG. 1, this is to show equipment that provides services in response to requests from the clients as a server. Thus, any of the client apparatus can provide a function as a server when providing its own data processing service to other clients. Therefore, the networked client apparatus shown in FIG. 1 can also serve as servers.

The network 100 is any of networks, such as wired, wireless, and other types of networks, and each of the networked equipment, transmits/receives communication packets, such as, e.g., Ethernet (trademark) frames, via the network 100. That is, a client transmits a frame wherein processing request information is stored in a data section of an Ethernet frame, to the server 101, whereby to execute data processing request to the server 101. The server 101 executes a data process in response to the processing request frame received, and stores resultant data resulting from the data process into a data section of a communication packet for transmission to each of the clients, as necessary.

The networked equipment include, e.g., Universal Plug and Play (UPnP)-compliant equipment. Therefore, this is a configuration in which equipment can be easily added to or deleted from the network. Equipment to be newly connected to the network performs:

(1) An addressing process for acquiring its own device ID such as an IP address.

(2) A discovery process for searching through devices on the network, receiving a response from each of the devices, and acquiring information such as device type, function, and the like contained in the response.

(3) A service requesting process for requesting a service to each of the devices on the basis of the information acquired in the discovery process.

By performing the above-mentioned processing procedure, services to which the networked equipment are applied can be received.

Figure 2:
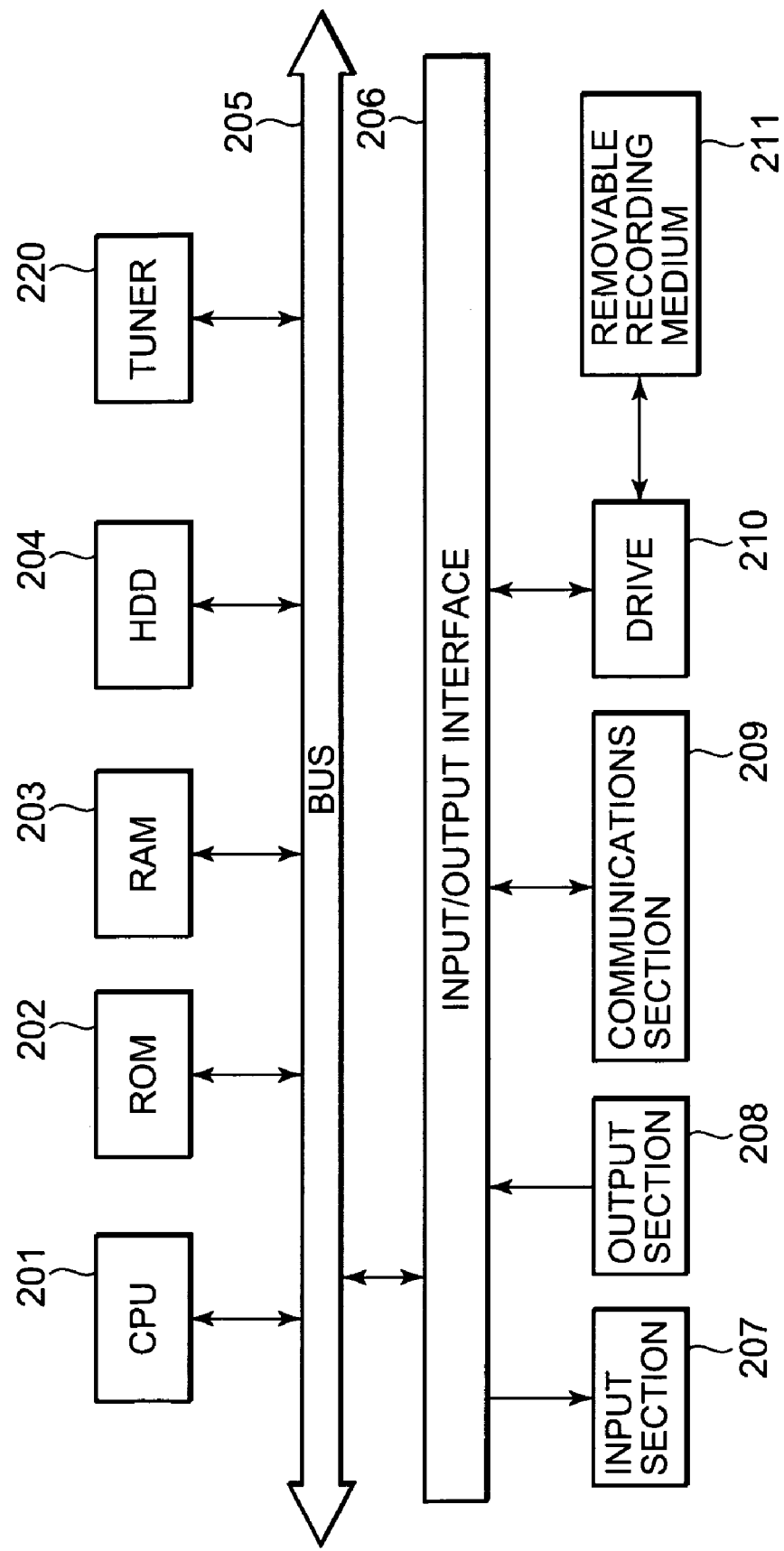
FIG. 2 is a diagram explaining an example configuration of networked equipment.

Referring to FIG. 2, an example hardware configuration of a PC will be described as examples of information processing apparatus constituting the server and the client apparatus shown in FIG. 1.

A CPU (Central Processing unit) 201 executes various processing according to programs stored in a ROM (Read Only memory) 202, or a HDD (Hard Disk Drive) 204, and the like, and functions as a data processing means or a communication control processing means. A RAM (Random Access memory) 203 stores programs executed by the CPU 201 and data, as appropriate. The CPU 201, ROM 202, and RAM 203, HDD 204 are connected with each other via a bus 205.

An input/output interface 206 is connected to the bus 205. To this input/output interface 206, there are connected an input section 207 that includes, e.g., a keyboard, switches, buttons, a pointing device, or a mouse operated by a user, and an output section 208 that includes a LCD, a CRT, speakers, and the like that presents various information to the user. Further, connected thereto are a communications section 209 functioning as a data transmission/reception means, and furthermore, a drive 210 that allows a removable recording medium 211 such as a magnetic disk, an optical disk, a magneto-optical disk, or a semiconductor memory to be releasably attached thereto, to execute a data reading or writing process from and to these removable recording media 211.

Furthermore, a tuner 220 is also provided which receives various distributed data from the outside, such as terrestrial broadcast data, satellite broadcast data, cable TV data, and Internet-distributed data.

While the configuration shown in FIG. 2 is of the server, the personal computer (PC) as examples of the networked equipment shown in FIG. 1, the networked equipment are not limited to the PC, but may include, as shown in FIG. 1, a portable communication terminal such as the portable telephone, the PDA, and various electronic equipment, information processing apparatus, such as the player, a display. Therefore, various hardware configurations unique to respective networked equipment can be implemented, under which processing according to the hardware involved is executed.

[Object Management and Metadata]

Next, an object management configuration including content in the server, which manages content provided to the clients, and metadata will be described. The server holds content including image data such as still pictures, moving pictures, audio data such as music which are stored in its storage section, and further, information regarding a tuner for executing live streaming data, e.g., channel information as attribute information (metadata) corresponding to the respective content.

Note that the content including image data such as still pictures, moving pictures, audio data such as music held by the server, and live streaming data received via the tuner will be collectively called "AV content". In the server, AV content is managed by a content management directory that has a hierarchical configuration in a CDS (Content Directory Service) within the server.

Figure 3:
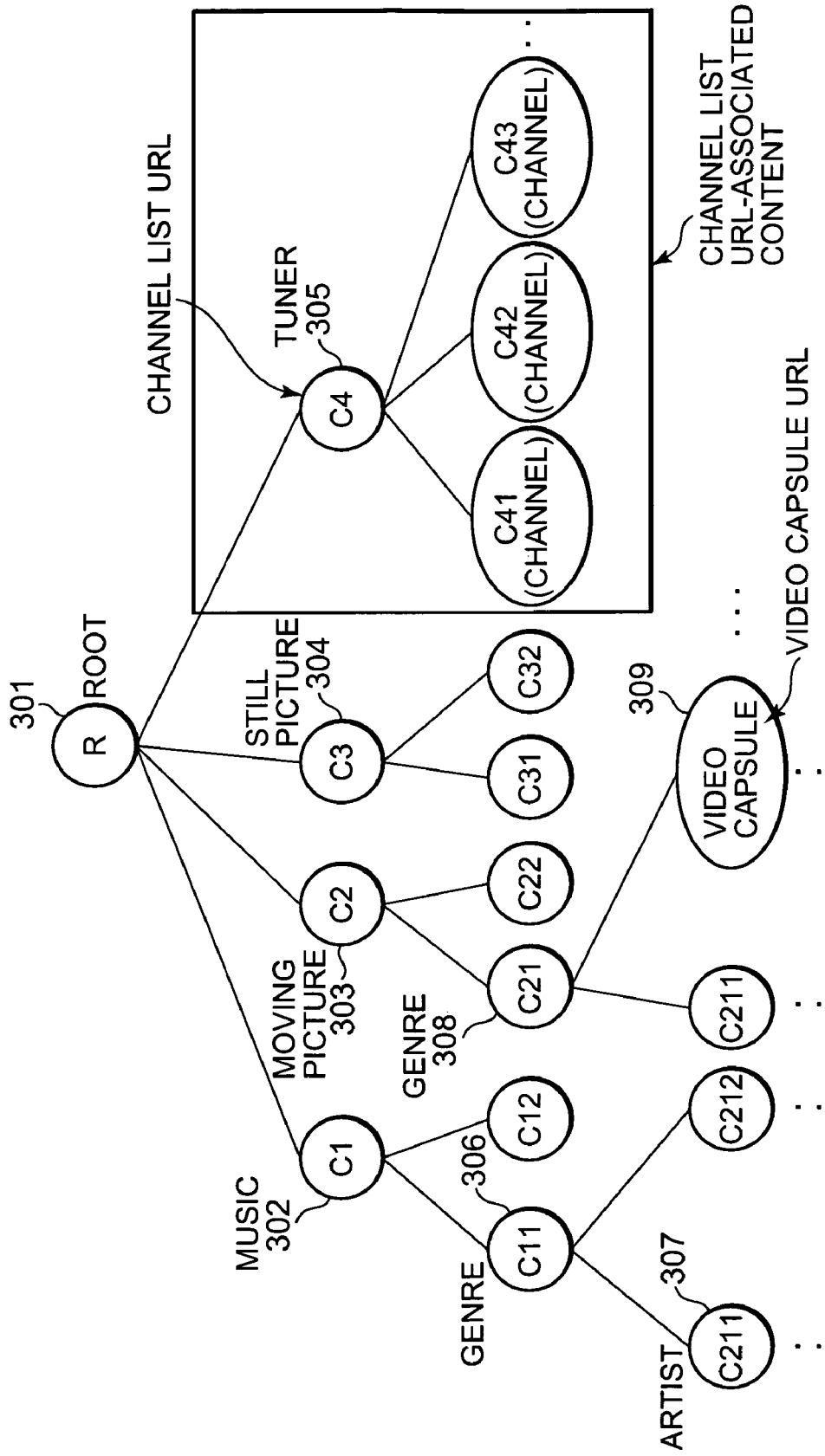
FIG. 3 is a diagram explaining a content management directory configuration in a server.

An example configuration of the content management directory managed in the CDS (Content Directory Service) of the server is shown in FIG. 3. The hierarchical configuration can be represented as being a branched tree-shaped diagram as shown in FIG. 3. Each of circles shown in FIG. 3 is an individual object. This hierarchical configuration shows a logical management configuration corresponding to content stored in the storage section and managed by the server, and to live streaming content.

Each of elements of the content management directory, i.e., an individual folder in which individual AV content or a plurality of AV content are stored, a metadata-stored folder is called an "Object". Note that an object is a general term given to a data unit processed by the server, and that there are various objects other than the folders each having individual AV content or a plurality of AV content, the metadata-stored folders.

A minimum unit of AV content, i.e., single tune data, single moving picture data, single still picture data, or the like is called an "item". In a case of live streaming data, a single channel is defined as a single item.

Further, a generic object above items which is defined as a set of items is called a "Container". A unit of the set of items can be set in various forms, such as a set based on a physical storage location of each of objects, a set based on a logical relationship between objects, a set based on a category.

For example, example containers each having channels as its items include a container formed from a set of only terrestrial channels as its items, and a container formed from a set of satellite broadcast channels as its items. These examples will be described further in a latter part.

Objects are classified into classes according to their types, such as, e.g., music (Audio), video (Video), photos (Photo), and then class-labeled. A client can designate, e.g., a specific class, and make a request for "searching" only objects belonging to that specific class for execution of the "searching". Further, the client can designate an object such as a specific folder, and make a request for "browsing" only information regarding that folder to perform a process of acquiring information regarding the specific folder. Note that in the server, classes are also managed in the form of a hierarchical configuration, and that subclasses can thus be set under a single class.

Metadata is various management information including attribute information corresponding to content held by the server, definition information about the classes, information regarding the hierarchical configuration from which the content management directory is formed. Metadata as attribute information about content defined in association with individual objects includes various information such as, e.g., a content identifier (ID) such as a content URL, a data size, resource information, a title, an artist name, copyright information, channel information. Each piece of information contained in the metadata is called a "property" or "property information". Note that which class has metadata formed from what property is defined beforehand for each of the above-mentioned classes, such as music (Audio), video (Video), photos (Photo), live streaming data, and the like.

In FIG. 3, the highest level is called a root container 301. Below the root container are, e.g., a music container 302, a moving picture container 303, a still picture container 304, and further, a tuner container 305, and the like. Objects are set such that, e.g., a genre 306 is set below the music container 302 and an artist 307 is set below the genre.

A genre 308 is set below the moving picture container 303, and a video capsule 309 as an item corresponding to content is set below that. For example, the video capsule 309 corresponds to video content stored in the storage section such as the hard disk within the server, and has attribute information (metadata) corresponding to that video content. The metadata contains a content identifier for acquiring the content, i.e., a URL (Uniform Resource Locator) of the content as address information indicative of the location of the content. The client acquires the URL of the video capsule 309, i.e., a video capsule URL through a content information acquisition procedure, and transmits a content request wherein the video capsule URL is designated, to the server, whereby the video content corresponding to the video capsule can be received from the server for reproduction.

Meanwhile, to the tuner container 305, there is also set a channel list URL as a URL corresponding to the container. That is, the channel list URL is set as attribute information corresponding to tuner-received content. The channel list URL is a URL set to provide the client with rights to acquire, control all content corresponding to channel items present as children of the tuner container 306.

In the conventional system, a URL is set for each channel, which is an item, and the client has been required to switch URLs when switching channels. However, in the present invention, a URL is set to a channel list as a set of channels, and the client transmits a content acquisition request wherein a channel list URL is designated, to the server, whereby the client can collectively obtain rights to acquire all content on channels listed in the channel list, i.e., rights to control all content of channel items set below the tuner container in hierarchical level in the content management directory. As a result, as to switching between channels listed in the channel list, there is no need to make a content request which is based on a new URL. Details of these processes will be described later.

A client wishing to execute content searching requests the server for "searching" wherein a hierarchical level or a class corresponding to a set of objects in the content management directory is designated, or for "browsing" as designation of a specific object, whereby the client can acquire content information. The client displays the content information on the display on the basis of XML data wherein the content information to be received from the server is described.

An example process of displaying a content information list is shown in FIG. 4. In the example shown in FIG. 4, a content information list 357, which has a data configuration in which information is listed under a content No., a title, an artist name, a channel, a content URL, is displayed on a display 350.

Content information displayed on the basis of metadata corresponding to, e.g., video capsules represents content having content Nos. [0001], [0002]. Content information displayed on the basis of metadata corresponding to tuner containers represents channel lists, and channel information and channel list URLs contained in the channel list, as in [0003], [0004].

These pieces of content information are generated on the basis of property information as elements of content-corresponding metadata managed by the server. The server acquires property information in the metadata about content which coincides with a condition, on the basis of a "searching" or "browsing" request received from the client, and generates XML data on the basis of the acquired property information, for transmission to the client.

The client receives the XML data which is based on the property information extracted by the server and corresponding to the content, and generates display data such as shown in FIG. 4 on the basis of the received XML data, for display on the display of the client.

A user on the client side selects content for reproduction from these items in the list, and transmits selected content designation information, e.g., a content URL to the server, whereby content, i.e., various content such as music and pictures, or photos is transmitted from the server, and the reproduction, output is executed on the client side. When a content request which is based on a channel list URL corresponding to a tuner container is made, content corresponding to channels listed in the channel list can be acquired collectively; i.e., channel switching can be executed freely without performing URL switching.

As mentioned above, content information transmitted to the client contains URLs (Uniform Resource Locators) of content as address information indicative of the locations of the content. On condition that a user has designated (clicked) a content URL or link data displayed on the client display, the client device generates an HTTP (HyperText Transfer Protocol) GET method, which is a content acquisition request, for transmission to the server, and the server transmits content corresponding to the content URL to the client.

[Content Reproduction Process by Client]

Figure 5:
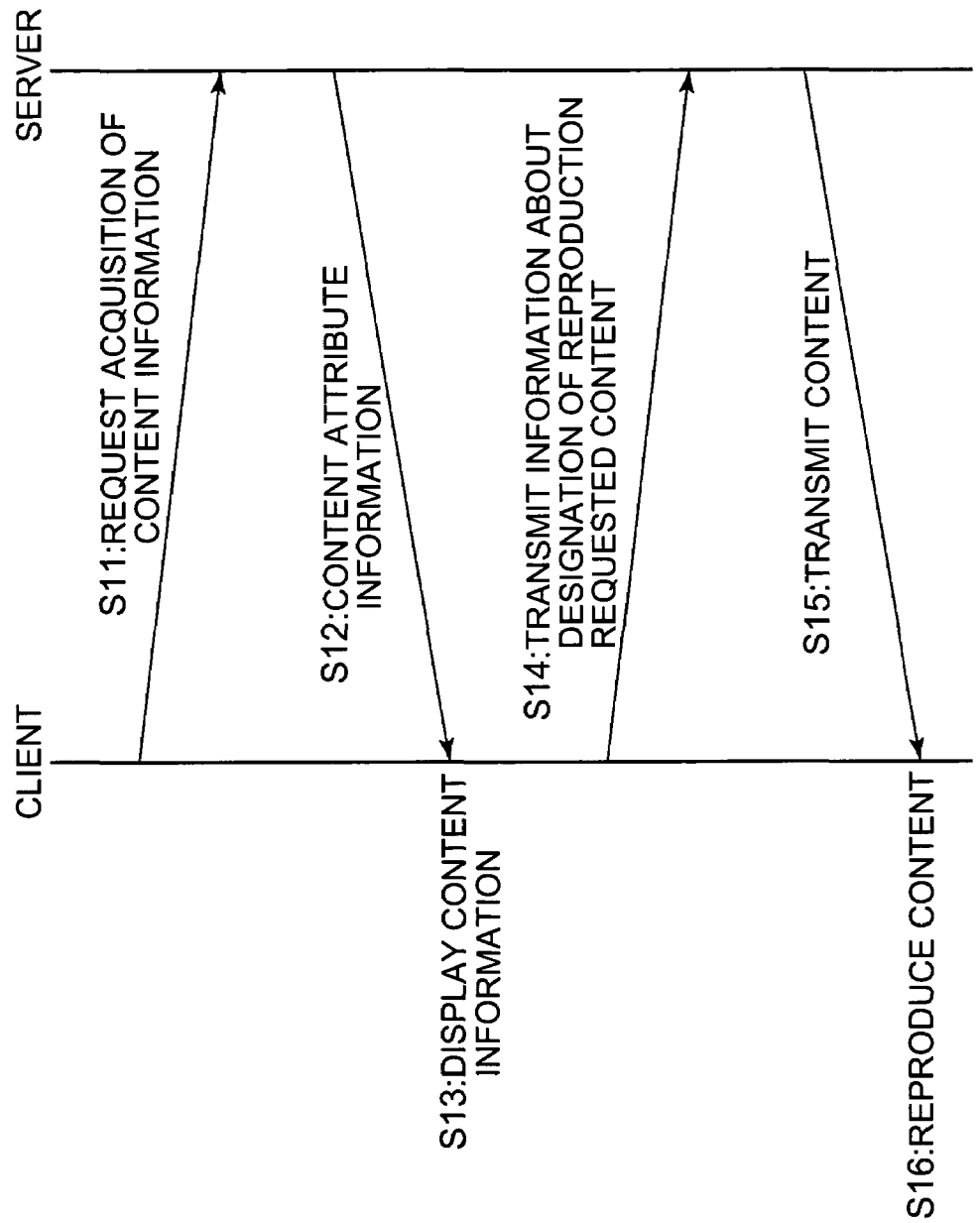
FIG. 5 is a diagram explaining a processing sequence between the server and a client in a content data reproduction process.

A client wishing to reproduce content can make a content request to the server, and receive the requested content from the server for reproduction of the content. Referring to FIG. 5, a typical content reproduction procedure will be described. First, in step S11, the client makes an acquisition request for content information held by the server. In step S12, the server generates the content information such as a list of content URLs (Uniform Resource Locators) as address information indicative of the locations of content, titles, artist names of the content on the basis of metadata corresponding to the content by XML (eXtended Markup Language) data according to the request from the client, for transmission to the client.

In step S13, the client displays the content information on the display according to the received XML information. For example, in a case of music content, the content information is displayed as a list formed from titles, artist names, reproduction times, and the like corresponding to a plurality of tunes held by the server.

Next, in step S14, the client selects a tune to be received from the server for reproduction in the client device, and designates a content URL as content designation information, for transmission to the server. In step S15, the server acquires content from the storage means on the basis of the received content designation information, for transmission. In step S16, the client reproduces the content received from the server. Note that where the content has been subjected to a compression process such as an ATRAC, MPEG process, a decoding process is performed on the server or the client side, after which a transmission process or a reproduction process is performed.

The typical content reproduction procedure is as mentioned above. The client can acquire various content attribute information, i.e., property information contained in metadata corresponding to content held by the server, display a UI such as a content list to the client on the basis of the property information, and select content, for requesting to the server.

[Live Streaming Data Distribution Process]

Content pre-stored on the hard disk or the like of a server can be acquired and reproduced when a client transmits a content request wherein a URL corresponding to the content is designated, to the server, as mentioned above.

However, as described above in the Related Art section, under the configuration in which URLs are set respectively to data on channels for live streaming data to be received via a tuner within a server to provide content on the basis of URL designation, an HTTP-GET method wherein a URL corresponding to a channel to be tuned to after channel switching is set must be transmitted when the client switches channels. As a result, connection breakage and re-connection processing which is based on new/old URLs must be performed between the server and the client, thus giving overload to both. From this arises a problem that communication is interrupted every time channels are switched.

To overcome this problem, in the present invention, it is configured to set a channel list, which is a set of a plurality of channels, and also set a single content URL to the channel list, while assuming that the channel list were single content, for management. A live streaming data distribution processing configuration which is based on the present configuration will be described below.

Figure 6:
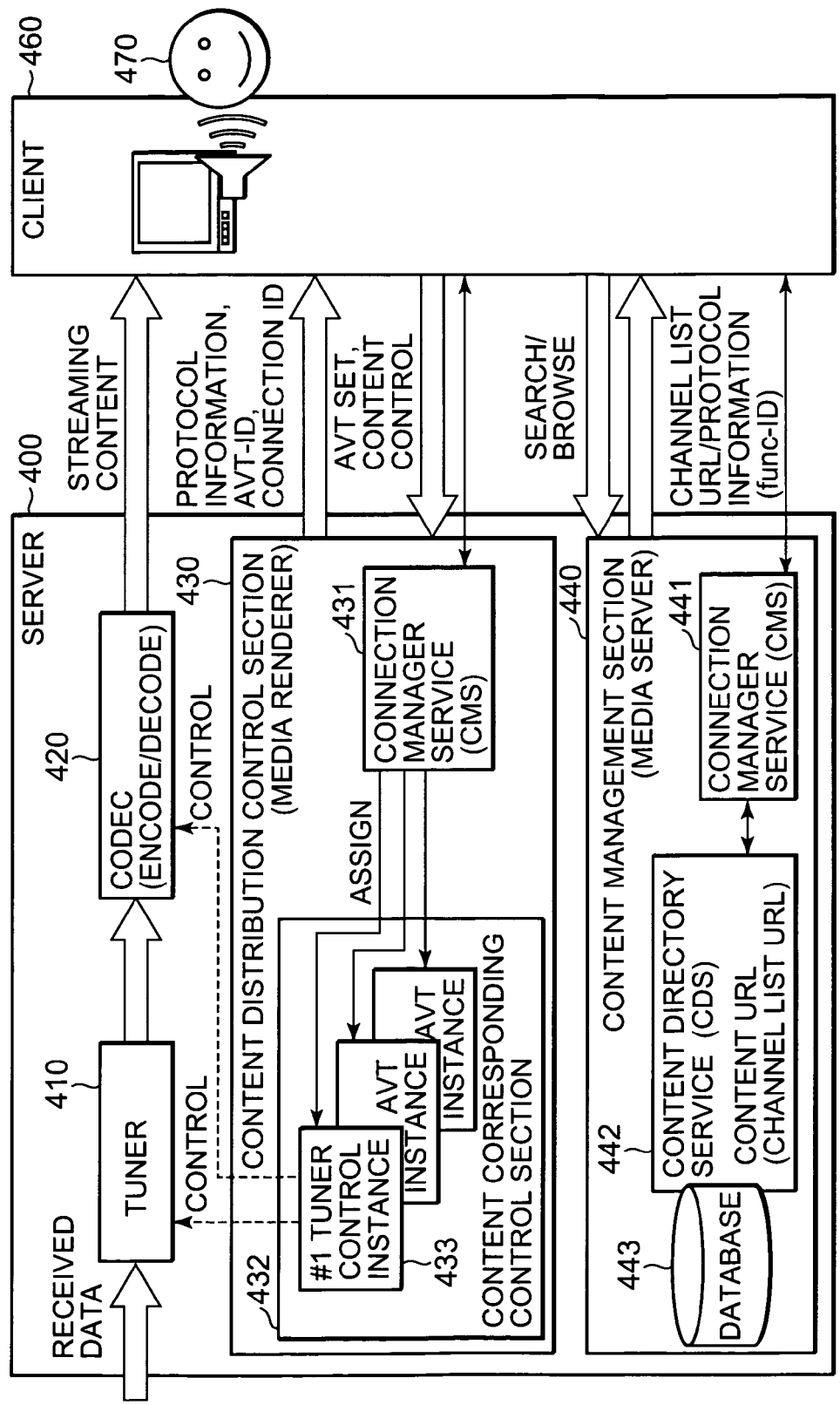
FIG. 6 is a diagram showing a configuration of a server that executes a streaming distribution process on tuner-received data.

FIG. 6 shows an example configuration of a server having a tuner and having a configuration in which data received by the tuner is distributed to clients.

The configuration shown in FIG. 6 will be described. A server 400 transmits requested content from a client 460 to the client 460, and a user 470 views the content via a display, speakers, and the like provided with a client 460 device. Note that in FIG. 6, there is shown only one client 460, but there are multiple clients connected to the server 400, whereby the multiple clients can have various content provided from the server 400.

The server provides content stored on a database 443, and further transmits data received from the outside via a tuner 410, i.e., various externally received data, such as, e.g., terrestrial broadcast data, satellite broadcast data, cable TV data, Internet-distributed data, to the client 460. A communication network between the server 400 and the client 460 is any of networks, which are, e.g., wired, wireless, and other types of networks as described with reference to FIG. 1 above, and communication packets such as, e.g., Ethernet (trademark) frames are transmitted/received via the network. That is, the client 460 transmits a frame wherein processing request information is stored in a data section of an Ethernet frame, to the server 400, whereby to execute a data processing request to the server 400. The server 400 executes a data process in response to the processing request frame received, stores resultant data resulting from the data process into the data section of a communication packet, for transmission to each of the clients 460.

The configuration of the server 400 will be described below. The tuner 410 is a streaming data reception section that receives various received data from the outside, such as terrestrial broadcast data, satellite broadcast data, cable TV data, Internet-distributed data. The tuner 410 is controlled by AVT instances (AV-Transport Instances) 433 as control instances that are set to a content-handling control section 432 within a content distribution control section 430 and that execute content distribution control per content for distribution. Note that in the present description, the term "control instance" means a control program capable of setting a controlled object such as hardware for control, and of setting control parameters which are in accordance with the set object. Control over the controlled object including hardware for control is executed according to the above-mentioned control program.

The content-handling control section 432 sets AVT instances (AV-Transport Instances) #1-#n 433 serving as content distribution control execution sections for respective content for distribution. An AVT instance 433 executes distribution control for each specific content. For example, a tuner control instance for live streaming of data received via the tuner executes control over only live streaming content of the data received via the tuner. Specifically, it receives an instruction, such as content transmission start/end or channel switching, from the client 460, and executes control such as channel switching on the tuner 410.

The AVT instances 433 set to the content-handling control section 432 include, besides tuner control instances, e.g., video capsule control instances that execute distribution control over video capsules which are video content stored on the hard disk within the server, DVD control instances that execute distribution control over video data, audio data, and the like stored on a DVD inserted into the server. Each of these AVT instances executes control over specific content for distribution.

A URL corresponding to content for control, i.e., a content URL as a content identifier is set to each of the AVT instances. The content URL is a content identifier indicative of the location of content. A video capsule URL set to a video capsule is set to a video capsule control instance. In the configuration of the present invention, a channel list URL corresponding to a tuner is set to a tuner control instance. An AVT instance 433 is correlated to content that it controls on the basis of a URL set to itself. Further, an AVT instance having a URL already set thereto means that it is given an AVT instance ID as its identifier. Details of these processes will be described later.

The content distribution control section 430 sets a plurality of tuner-received content corresponding to a plurality of channels described in a channel list as a single unit of controlled content, and assigns a single AVT instance thereto. An AVT instance receives a control request corresponding to a channel list identifier received from a client; and the AVT instance executes control over content for distribution corresponding to the plurality of channels described in the channel list.

A connection manager service (CMS) 431 conveys protocol information inputted to the live streaming control section 430, to the client 460. Further, it assigns an AVT instance 433 on the basis of protocol information presented thereto by the client 460, for notification to the client 460.

The connection manager service 431 executes a process of assigning (allocating) an AVT instance, according to a content request from the client 460, and notifies the client 460 of the identifier of the assigned AVT instance, i.e., an AVT instance ID. At this time, a connection ID as a connection identifier between the server and the client is also notified to the client 460. The connection manager service 431 registers these data in a connection management table. The connection management table will be described later.

After the above-mentioned process by the connection manager service 431, through a request for the AVT instance 433 from the client 460, the above-mentioned content URL and AVT instance ID are set to the AVT instance 433.

As a result of the AVT instance 433 assignment process by the connection manager service 431 and the URL selling process by the client 460, the content-corresponding URL has been set, and when the AVT instance 433 now in charge of distribution control over content identified by the URL receives a control command from the client 460, it executes content control according to the control command. In this content distribution control process between the client 460 and the server, e.g., a SOAP (Simple Object Access Protocol), is used. The client 460 generates description data compliant with XML data for transmission to the AVT instances 433, whereby control information from the client 460 is notified to the respective AVT instance 433, and then the AVT instance 433 executes control which is based on the received information, e.g., processing such as content reproduction start/end, channel switching.

For example, when channel switching instruction information is inputted as control information from the client 460 to a tuner control instance 433, the control information is inputted to the tuner 410 from the tuner control instance 433 to set such that the tuner 410 receives specific channel data.

Note that a connection for distribution of tuner-received content between the server and the client is an HTTP (Hyper-Text Transfer Protocol) connection set on the basis of a channel list URL. In the configuration of the present invention, content distribution is executed in which the HTTP connection set on the basis of the channel list URL is continuously used, before and after the channel switching executed as switching of a plurality of tuner-received content corresponding to a plurality of channels described in a channel list.

Data received by the tuner 410 may be, e.g., coded data (ATRAC (adaptive transform acoustic coding), MPEG (moving picture experts group), and the like) in one case, and raw data in other cases. Between the server and the client, it is preferable to distribute the data as specific coded data in order to enhance data transmission efficiency. The coded data must be data processable by the client 460. A codec 420 converts data received by the tuner 410 into a data mode processable by the client 460. The codec 420 has data encoding and decoding functions. Converted data generated at the codec 420 is transmitted to the client 460 and reproduced.

What kind of data conversion is to be made at the codec 420 is determined by control information from an AVT instance 433. The AVT instance 433 receives request information from the client 460, and control information from the AVT instance 433 is inputted to the codec 420, and the codec 420 executes data conversion on the basis of the control information.

A content management section (media server) 440 functions as a content folder. It has a content directory service 442 that manages content-corresponding metadata on the basis of the database 443 storing metadata of the content therein and the content management directory described with reference to FIG. 3 above, and that provides content information in response to a processing request, such as content searching, browsing, from the client 460.

The database 443 stores not only information about content pre-stored on a database within the server, but also management information such as information about data received via a tuner, e.g., channel information, as metadata corresponding to a tuner container. Where the content directory service 442 receives a content information acquisition request regarding the tuner from the client 460, the content management section 440 executes, e.g., a process of providing the client 460 with information, such as server-receivable channel information, a channel URL associated with a channel list set as a set of a plurality of channels.

The content directory service 442 holds URLs for live streaming content, codec information, protocol information on the database 443 as metadata for content handled in live streaming, and transmits these pieces of information to the client 460 according to a request from the client 460.

Note that the client 460 can learn whether or not the server can distribute live streaming content, through protocol information from the content directory service 442. Information (function ID (func ID)) indicating that content distribution by tuner control can be implemented is set to the protocol information, and thus the client can learn that streaming distribution of live data via the tuner is possible on the basis of the function ID. The function ID is an ID set for each controlled object for content processing such as tuner control, DVD control, hard disk control. If there are two tuners, different function IDs, such as, e.g., a funcID=a, a funcID=b, are set, and they are used also as tuner identification information.

Where the client 460 desires to have tuner-received live streaming data distributed on the basis of content information from the content directory service 442, it transmits information acquired from the received content information to the connection manager service 431 of the content distribution control section 430. Details of these processes will be described later.

Thereafter, an AVT instance 433 is assigned in the content distribution control section 430, and the client can execute various control, such as control over content for distribution, e.g., temporary stop (STOP) of content, channel switching (SEEK).

A connection manager service (CMS) 441 within the content management section 440 performs communication control service between the client 460 and the content management section 440, such as conveying protocol information outputted from the content management section 440, to the client 460. Where there are a plurality of clients 460 connected to the server 400, it executes connection ID management per client 460, and handles requests from the respective clients 460 by identifying the requests.

Figure 7:
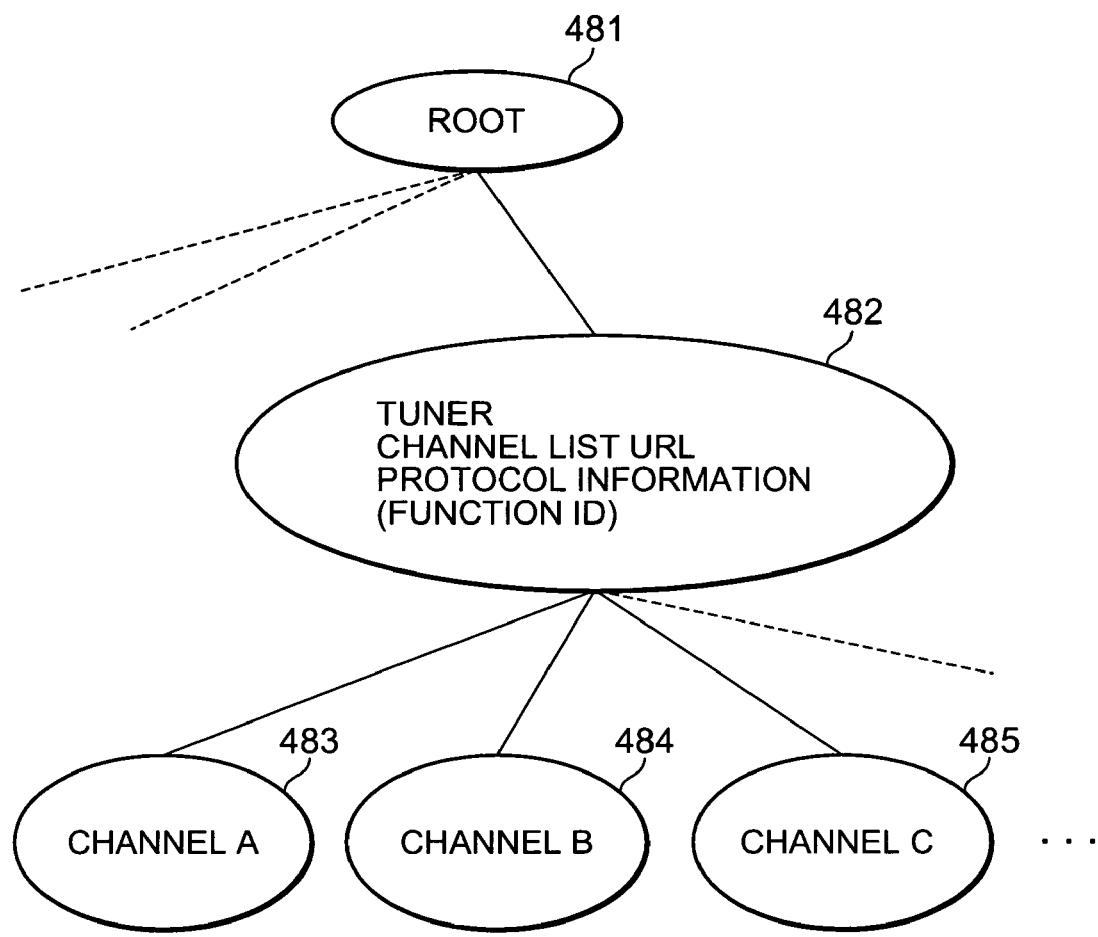
FIG. 7 is a diagram explaining a tuner container and channel items in the content management directory configuration in the server.

Referring to FIG. 7, an object management configuration as to metadata related to live streaming data in the content directory service 442 will be described.

As described with reference to FIG. 3 above, the content providing server manages metadata corresponding to various content in a directory that has a hierarchical configuration. FIG. 7 shows a management configuration of metadata related to live streaming data managed by the content directory service 442.

A tuner container 482 is set below a root container 481. Note that setting modes for tuner containers set in the directory differ, depending upon the number of tuners and the setting modes for channel list URLs. These modes will be described in detail later. Individual channels 483, 484, 485 are set to items which are set as children of the tuner container 482.

Metadata as content attribute information are associated with containers and items, respectively, and content information based on these metadata is provided by the server according to a content information request, such as searching or browsing, from the client 460.

A channel list URL, protocol information, and the like are stored into the tuner container 482 as metadata. Information such as channel names (Tokyo TV, ABC TV, and the like) is stored into the channel items 483, 484, 485.

The channel list URL set as metadata of the tuner container 482 is set as a URL for acquiring a single channel list in which, e.g., where the tuner can receive only 1 to 12 terrestrial channels, twelve channels from 1 to 12 channels are listed. Where the tuner can receive broadcast data through channels (1 to n channels) such as terrestrial broadcasting, satellite broadcasting including BS, CS, the channel list URL is set as a URL for acquiring a single channel list in which n channels, i.e., 1 to n channels are listed.

Note that channel lists classified according to categories, such as a terrestrial channel list, a BS channel list, a CS channel list, may otherwise be set, whereby to set different channel list URLs thereto, respectively.

The client 460 can acquire these channel list URLs through a content information acquisition process to which "searching" or "browsing" from the client 460 to the content directory service (CDS) 442 is applied.

When the client 460 performs content acquisition which is based on a channel list URL acquired, it can execute switching control over, e.g., 1 to 12 channels on the basis of that single URL set in the channel list. That is, the client 460, through channel list URL-based content acquisition, can collectively obtain rights to control over all the streaming data listed in the channel list. Specific control will be described later.

In the configuration of the present invention, as mentioned above, a content URL is set to a channel list which is a set of channels, in order to permit collective control over a plurality of channels, instead of setting URLs to the individual channels, respectively. Therefore, the rights to control over streaming data corresponding to the channels listed in the channel list can be provided collectively to the client 460.

Where the client 460 has a channel list-based control right, it does not have to set an HTTP connection which is based on a new URL even where processing such as switching channels in the list is to be performed. By only transmitting a control instruction such as a channel switching instruction to the content distribution control section 432, it can perform the channel switching, and therefore, it is no longer required to perform processing, such as re-setting of the connection between the server and the client which is based on switching of new/old URLs.

As shown in FIG. 7, as children of the tuner container 482, channels corresponding to the channel list URL held by the tuner container 482, e.g., the 1 to 12 terrestrial channels are set as child items. Information about each of the channels is set to the corresponding item as metadata.

FIG. 8 shows content information (metadata) corresponding to a tuner container and a channel item. Data shown in FIG. 8 is an example of XML data transmitted to the client 460 according to a content information request to the content directory service (CDS) 442 from the client 460.

FIG. 8 (*a*) represents information which is based on metadata corresponding to a tuner container, and has information such as shown below.

```
<container id="ch-list" parentID="-1" restricted="1" . . . >
<dc:title> terrestrial channel list </dc:title>
<upnp:class>object.container.function.avVideoTuner</upnp:class>
<av:allowedOperation>Play<av:allowedOperation>
<av:eventingURI>http://1.2.3.4:56000/SENA?id=live</av:eventingURI>
<res
protocolInfo="http-get:*:video/mpeg:func-
id=t01"av:codec="MPEG1V" . . . >
http://1.2.3.4:56000/liveoutUrl
</res>
</container>
```

From the upper line, a container ID, a title, data regarding a class, and further, an allowed process [allowedOperation], a URL for event notification [eventingURI], protocol information [protocolInfo], and the like are stored as content information about the tuner container. The term "event notification" means a URL set to execute a process of giving notice to the client 460 where an event occurs which corresponds to content for distribution, such as, e.g., switching between stereo/mono, switching to bilingual broadcasting. The client 460 transmits an event notification request wherein a URL for event notification is designated, to the server, whereby it can receive various event notices in parallel with content distribution.

The function ID [func-id=t01] in the protocol information [protocolInfo] shown in a data section 491 of FIG. 8 indicates that this content is live streaming content, i.e., that content distribution by tuner-applied control is to be executed. As mentioned above, the function ID is an ID set for each controlled object for content distribution, such as tuner control, DVD control. If there are two tuners, different function IDs, such as, e.g., the funcID=a, the funcID=b, are set. A line [http://1.2.3.4:56000/liveoutUrl] shown in a data section 492 of FIG. 8 is a channel list URL.

FIG. 8 (b) represents information which is based on metadata corresponding to a channel item, and has information such as shown below.

<item id="ch8" parentID="dev0" restricted="1">
<dc:title>Tokyo TV</dc:title>
<upnp:
class>object.item.videoItem.videoBroadcast.avChannel
</upnp:class>
<upnp:channelName>Tokyo TV</upnp:channelName>
<upnp:channelNr>8</upnp:channelNr>
. . .
</item>

From the upper line, a title, a class, a channel name, a channel number are described. The client 460 acquires content information corresponding to a tuner container and a channel item, whereby the client can learn in what range it can acquire the channel control right, from a content request which is based on the channel list URL set to the tuner container.

The client 460 displays the channel information list on the display of the client 460 on the basis of XML data formed from the content information shown in FIG. 8.

Figure 9:
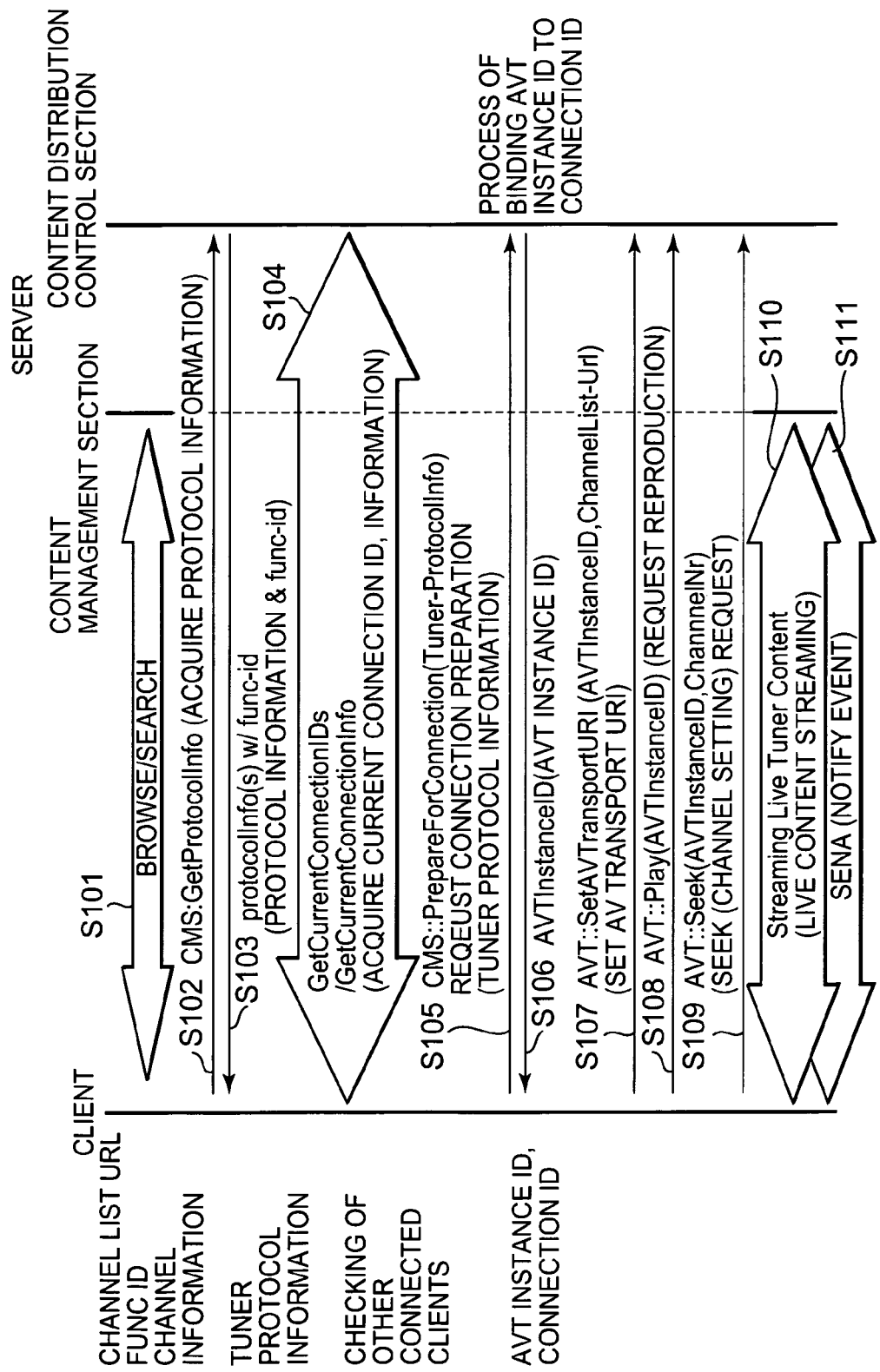
FIG. 9 is a diagram explaining a processing sequence between the server and a client that execute the streaming distribution process on tuner-received data.

Referring next to FIG. 9, details of a streaming data distribution processing sequence which is based on a channel list URL executed between the server and the client will be described.

First, the client 460 acquires content information by a "browsing" or "searching" process in step S101, in order to check content that is held by the server and can be provided to the client 460. The client 460 wishing to execute content searching requests the server for "searching" to which a hierarchical level or a class corresponding to a set of objects in the content management directory is designated, or for "browsing" as designation of a specific object, whereby the client 460 can acquire information about the content. The "browsing" or "searching" is executed to the content directory service 442 of the content management section 440 (see FIG. 6), and the content directory service 442 generates XML data which is based on metadata corresponding to the respective objects from the database 443 storing the metadata therein, for provision to the client 460 as the content information.

For example, where content information about a tuner container has been acquired, the tuner container-corresponding content information shown in FIG. 8 (a) and the information based on channel-based content information shown in FIG. 8 (b) are transmitted to the client 460. Note that the information shown in FIG. 8 (b) is content information corresponding to a single channel. Where the client 460 requests information about a tuner container and all the channels as child items, as many pieces of the information shown in FIG. 8 (b) as the number of channels set as child items of the tuner container are to be transmitted to the client 460.

The client 460 displays the content information on the display on the basis of XML data describing the content information received from the server. This is display information such as described with reference to FIG. 4 above.

The client 460 acquires:
a channel list URL;
a function ID (funcID); and
channel information
on the basis of the content information corresponding to the tuner container and the channel item shown in FIGS. 8 (a), (b).

Next in step S102, the client 460 transmits a protocol information acquisition request to the connection manager service 431 of the content distribution control section 430. This is a process of requesting a list of protocol information that can be inputted to the content distribution control section 430, i.e., protocol information that can be processed by the content distribution control section 430.

In step S103, the connection manager service 431 transmits the protocol information list to the client 460. This protocol information list contains various protocol information that can be processed by the content distribution control section 430, such as, e.g., MPEG as a protocol for video data, ATRAC for audio data.

The protocol information list transmitted to the client 460 from the connection manager service 431 of the server that can distribute received data by the tuner 410 contains information indicating that live streaming data can be distributed. Specifically, protocol information, which is [internal:1.2.3.4:application/x-av-tuner-content:func-id=t01], is contained. That is, information having [internal] described in a schema column (first column) is contained. This protocol information indicates that a logical connection with the internal content management section (media server) 440 can be made by connection preparation (PrepareForConnection) which will be described below.

This protocol information also contains a function ID. As mentioned above, the function ID is an ID set for each controlled object for content distribution, such as tuner control, DVD control, and is also contained in the content information acquired from the content directory service 442 by the "browsing" or "searching" process performed by the client in step S101. Here, the function ID [func-id=t01] is set as a function ID corresponding to content distribution to which the tuner 410 is applied.

Next in step S104, the client 460 acquires information about other clients currently connected to the server 400. The connection manager service 431 is executing connection management, while holding a connection management table such as shown in FIG. 10 in which connection IDs corresponding to the clients connected to the server are associated with client identifiers and protocol information corresponding to content to be distributed to the respective clients. These pieces of information are provided to the client 460 according to a connection information acquisition request from the client 460. This process will be described later. Note that this connection information notification process is to be performed by a client 460 in order to check the connection situation as to other clients 460, and thus can be omitted.

In step S105, the client 460 transmits a connection preparation request (PrepareForConnection) to the connection manager service 431. Where the client 460 desires distribution of tuner-applied live streaming data, the client only has to transmit protocol information having a function ID that coincides with the function ID (funcID) contained in the content information corresponding to the tuner container as content information received from the content directory service (CDS) 442 previously.

In transmitting the connection preparation request (PrepareForConnection) in step S105 the client 460 transmits the protocol information [internal:1.2.3.4:application/x-av-tuner-content:func-id=t01] regarding live streaming received from the connection manager service 431 in the above-mentioned protocol information acquisition (S103).

The connection manager service 431 having received the connection preparation request (PrepareForConnection) from the client 460 judges that it is a request for streaming distribution of tuner-received data, on the basis of the protocol information [internal:1.2.3.4:application/x-av-tuner-content:func-id=t01] contained in the connection preparation request, and sets (assigns) one AVT instance 433 within the content-handling control section 432 as a tuner control instance, whereby to perform a binding process, i.e., associating a connection ID for the client 460 having made the connection preparation request (PrepareForConnection) with an identifier (AVT instance ID) of the AVT instance set (assigned) as the tuner control instance.

Note that as mentioned above, the connection manager service 431 has the connection management table shown in FIG. 10, i.e., data in which a connection ID is associated with an AVT instance ID/protocol information for each connected client 460, and manages this as connection management information.

In step S106, the connection manager service 431 notifies the client 460 of an AVT instance ID, which is an identifier of the assigned AVT instance, and connection ID information set to the connection between the client 460 and the server. The client 460 stores these pieces of information into a memory.

In step S107, the client 460 issues a URI (Uniform Resource Identifier) setting request to the assigned AVT instance as processing for causing the AVT instance assigned by the connection manager service 431 to perform content distribution control. The URI set to the AVT instance contains the AVT instance ID notified from the connection manager service 431, and the channel list URL contained in the content information corresponding to the tuner container acquired in the processing of step S102.

The AVT instance now can identify content and a client which it is to control on the basis of the AVT instance ID and the channel list URL designated by the client 460. That is, the client that transmits various control instructions by designating the AVT instance ID is a client corresponding to the AVT instance, and the channel list URL is content for control.

The channel list URL is content corresponding to the tuner container, and the AVT instance wherein the channel list URL is set is to be set as an instance that executes control over the tuner 410.

Next, the client 460 can execute requesting of various content control to the AVT instance, in step S108 and forward. In step S108 a reproduction (Play) request is issued to the AVT instance. This control request uses, e.g., the SOAP (Simple Object Access Protocol). On the basis of SOAP, the client 460 generates description data compliant with XML data, for transmission to the AVT instance 433.

The AVT instance 433 executes control which is based on the received information from the client 460, e.g., processing such as content reproduction start/end, channel switching. The AVT instance 433 specifies content for control on the basis of the set content URL, and controls that specified content for control. In this case, the content URL is a channel list URL, and the channel list URL is content information corresponding to the tuner container. Thus, the AVT instance 433 executes control over the tuner 410.

When the AVT instance 433 receives the reproduction (Play) request of step S108, the AVT instance 433 controls the tuner 410, to start transmission of tuner-received data to the client 460.

In step S109, a channel setting (Seek) request is issued to the AVT instance. This request contains the AVT instance ID and a channel number. When the AVT instance 433 receives the channel setting (Seek) request, the AVT instance 433 controls the tuner 410 to set a channel on the tuner to transmit received data to the client 460.

Step S110 indicates distribution of live streaming data which is to be executed continuously thereafter. Step S111 indicates that an event notification process (SENA) is executed in parallel with content distribution. As mentioned above, the term "event" means information regarding content for distribution, such as, e.g., switching between stereo/mono, and is a process by which the server gives notice of various event information on the basis of an event notification request from the client 460 which is based on an event URL.

Figure 11:
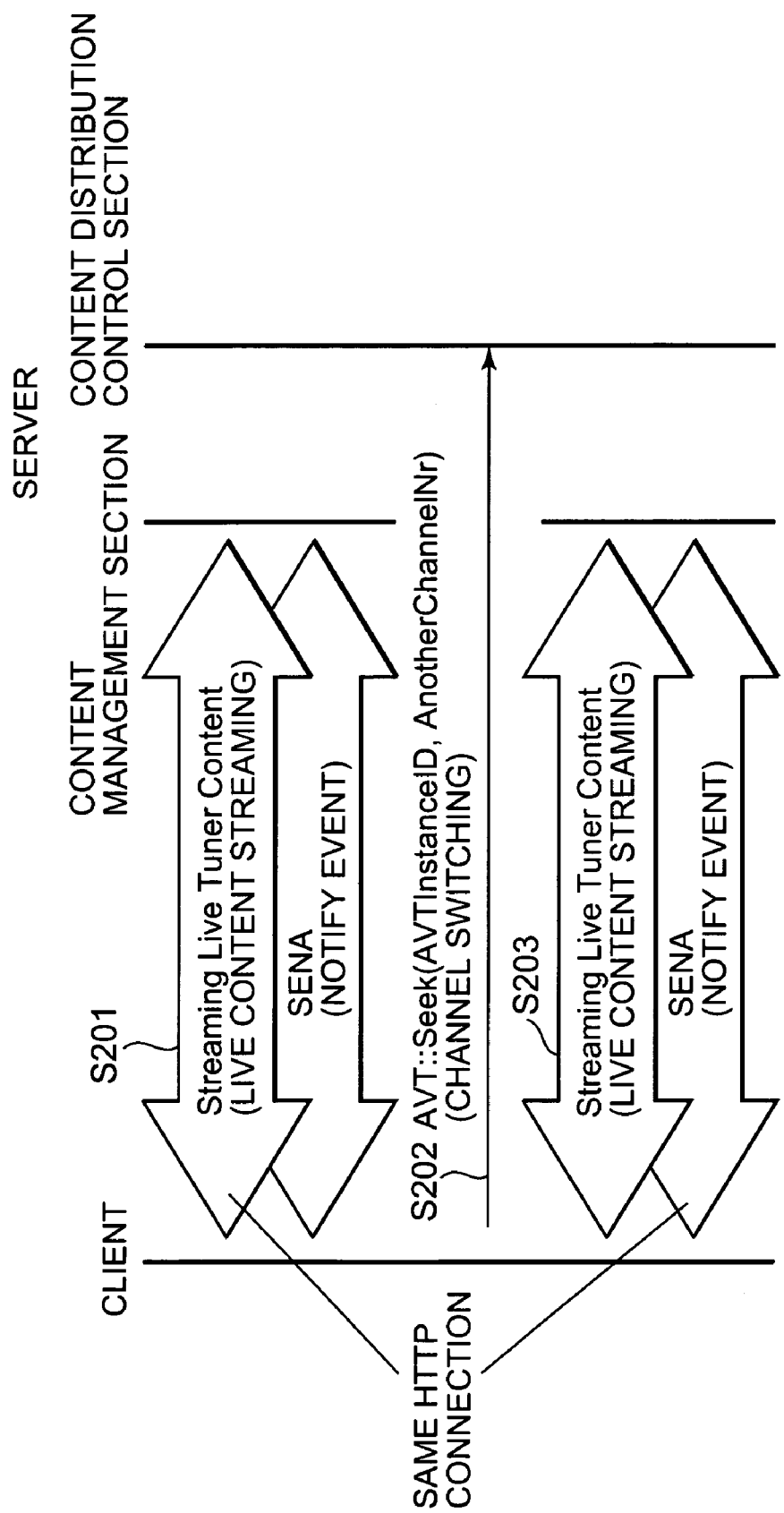
FIG. 11 is a diagram explaining a channel switching process in the processing sequence between the server and the client that execute the streaming distribution process on tuner-received data.

Referring to FIG. 11, a channel switching processing sequence will be described. The channel switching process is executed during distribution of streaming data which is based on a channel list URL. It is assumed that distribution of streaming data and event notification have been executed in step S201.

In step S202 the client 460 issues a channel switching (Seek) request to the AVT instance. In this control, e.g., the SOAP (Simple Object Access Control) protocol is used, as mentioned above. The client 460 generates description data compliant with XML data, for transmission to the AVT instance 433. This request contains an AVT instance ID and a channel number for switching. When the AVT instance 433 receives the channel setting (Seek) request, the AVT instance 433 controls the tuner 410 to perform switching to the channel on the tuner, to transmit received data to the client 460.

Thereafter in step S203, distribution of streaming data corresponding to the channel tuned to after the switching and event notification are executed.

Since the HTTP connection between the server and the client before and after this channel switching is an HTTP connection which is based on the same URL, i.e., the same channel list URL, the channel switching is to be executed with the connection maintained between the server and the client.

In this way, when channels in a channel list are to be switched, a channel switching request (AVT Seek action) is performed to an AVT instance. At this point, not only the client 460 that has performed the channel switching request (AVT Seek action) but also client(s) using the same live streaming has the content changed without breaking the HTTP connection.

Note that where image or audio data to be transmitted to the client from the server is coded data such as, e.g., MPEG data, when data for transmission is switched unconditionally on the basis of a channel switching timing received from the client, unmatching of coded data packets to be transmitted may occur in some cases. When the client side decodes such unmatched coded data, content reproduction error is caused due to decoding error.

For example, in an MPEG-2 system, a Pack is used as a single processing unit. The Pack is formed by combining a plurality of PES (Packetized Elementary Stream) packets, which are individual data streams such as video and audio data streams, and further, by storing control information into a header thereof. Therefore, when channel switching is executed to change data for transmission during transmission of part of PES packets that form a Pack, some dropout occurs in the Pack, which is a single processing unit at the time the client decodes data, thus causing reproduction error.

Therefore, the content distribution control section 430 of the server judges whether or not matching of coded data for transmission can be maintained even when the data for transmission is changed on the basis of the channel switching request from the client, and where it is judged that the matching cannot be maintained, it breaks the connection for distribution of data streams between the server and the client, i.e., the HTTP connection which is based on the channel list URL. The server further notifies the client that the connection for distribution of data streams has been broken via an event notification connection.

Where the client receives a connection breakage notice from the server, the client performs a process of setting the HTTP connection which is based on the channel list URL again; i.e., it transmits an HTTP-GET method which is based on the channel list URL, to the server. Note that the setting status of the AVT instance (tuner control instance 433) is maintained, and thus setting processing, such as assigning anew a tuner control instance 433, setting a URI can be omitted.

It may alternatively be configured such that, instead of executing the channel switching unconditionally on the basis of the channel switching timing received from the client, the server, after having received the channel switching request from the client, waits until a timing at which matching of encoded data for transmission to the client can be maintained arrives, and executes switching of data for transmission to the client at the timing at which the matching can be maintained. This switching timing control is performed by detecting a data encoding situation in the codec 420, inputting the detected information to the tuner control instance 433, and executing the channel switching on the tuner 410 under the timing control by the tuner control instance 433.

When the server side executes such channel switching timing control, occurrence of decoding error on the client side can be prevented, whereby the client side can reproduce data before the channel switching and data after the channel switching normally.

Figure 12:
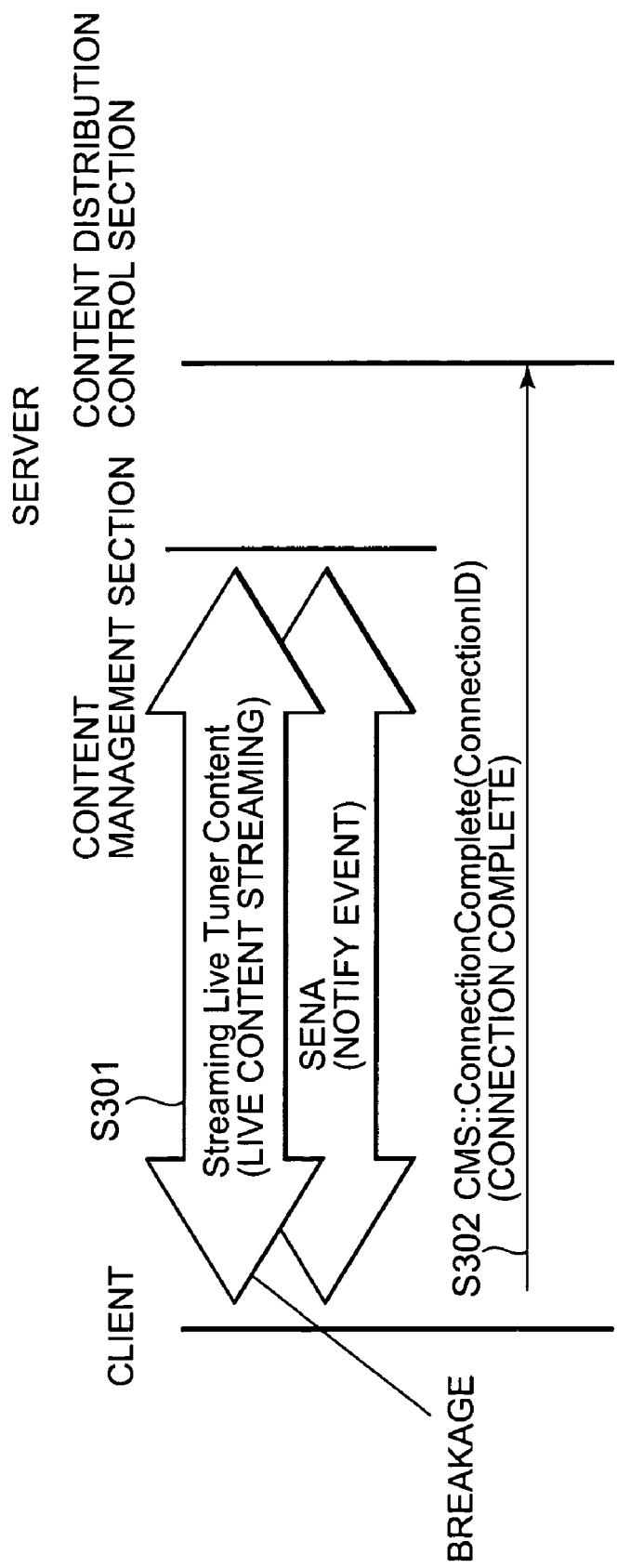
FIG. 12 is a diagram explaining a connection completion process in the processing sequence between the server and the client that execute the streaming distribution process on tuner-received data.

Referring next to a sequence diagram of FIG. 12, a process in a case of completing the live streaming data distribution process will be described. It is assumed that distribution of streaming data and event notification have been executed in step S301.

The client 460 wishing to end the live streaming data distribution process, transmits a connection complete request wherein a connection ID is stored, to the connection manager service 431, in step S302. The connection ID is the one that has been received from the connection manager service 431 in step S106 of the sequence diagram of FIG. 9. The connection manager service 431 breaks the server-client connection according to a request from the client 460, and further deletes the corresponding entry from the connection management table described with reference to FIG. 10.

Note that the client 460 can learn the presence of other clients that are using the same AVT instance by an inquiry process of step S104. By performing this check beforehand, one can see which function ID (func-id) should be selected to use an empty AVT instance. When this check is performed, a process for which considerations are given to the other clients can be performed.

For example, where all AVT instances are used, a message saying "Other users may be viewing. Are you really sure?" or the like is transmitted to the client 460 from the server at the time of a channel change, and a message displaying UI is generated at the client 460 for presentation, whereby careless control over connections of other clients, e.g., careless channel switching, can be prevented in a network in which a plurality of clients are connected.

Details of the connection information acquisition process of step S104 are as follows. First, a current connection ID request (GetCurrentConnetion IDs) is made to the connection manager service 431 of the content distribution control section 430. A list of connection IDs (Connection IDs) which are currently active is returned as a return value. When a connection information request (GetCurrentConnectionInfo) is made using each connection ID, one can see protocol information (ProtocolInfo) assigned by that connection ID. Where a function ID (func-id) written in additional information (AdditionalInfo) in this protocol information is the same as a function ID which the client wishes to use, one can see that the same internal resource (a tuner or the like) is being handled.

As mentioned above, the client 460 has an AVT instance assigned by the connection manager service (CMS) 431, and sets a channel list URL corresponding to a tuner container to that AVT instance, whereby the client can start live streaming based-on that URL.

Note that where there is a limit in the number of AVT instances that can be set in the content distribution control section 430, the connection manager service (CMS) 431 of the content distribution control section 430 executes the following process to control setting of AVT instances.

When the connection manager service (CMS) 431 is requested from the client to assign an AVT instance anew with the limited number of AVT instances already assigned, the old connections prevail. That is, any of the AVT instances set on the basis of the old connections is not switched on the basis of a new request.

However, this holds true as far as the limited number of AVT instances is concerned. In a case where it is a request to deal with the same AVT instance, even if that AVT instance has already been provided to another client, the same AVT instance ID may be provided anew to different connection IDs. In this case, a plurality of clients can execute control which is based on a single AVT instance.

Specifically, two or more clients can execute control by an AVT instance wherein a single channel list URL is set, and thus a control instruction, e.g., a channel switching process, from any of the clients can be validly executed under the control by that single AVT instance.

Note that in a case of a server whose content distribution control section 430 has two AVT instances, an AVT instance-#0 and an AVT instance -#1, but which can operate only one AVT instance at once, processing is executed as in, e.g., the following items a to f.

a. First, client 1 requests AVT-#0 to be assigned.
b. AVT-#0 is assigned to connection ID-1.
c. Next, client 2 requests AVT-#0 to be assigned.
d. AVT-#0 is assigned to connection ID-2.
e. Next, client 1 requests AVT-#1 to be assigned.
f. An error is returned to client 1.

By executing such processing, the number of AVT instances that can be set can be limited.

As mentioned above, a channel list URL can be obtained from the content directory service (CDS) 442. When a tuner is in a Play state, i.e., in a state where content is being distributed to a client, all clients (only when the server is handling a plurality of clients) having already made their content request which is based on HTTP-GET to this channel list URL can obtain streaming from the tuner upon setting of the channel list URL to the AVT instance.

That is, where a client wishes to merely monitor the streaming used by another client, the client can obtain the streaming from the tuner by only issuing a URL for the streaming, i.e., an HTTP-GET method wherein the channel list URL obtained from the content directory service (CDS) 442 is set, without executing setting of an AVT instance.

Where the content distribution control section 430 of the server 400 receives an HTTP-GET method as a content request wherein the same channel list URL is designated from another client during its executing distribution control over content on a plurality of channels received by the tuner 410 and specified on the basis of the channel list URL as a channel list identifier under the control by the AVT instance, that requesting client can execute distribution of the tuner-received content specified on the basis of the channel list URL through the HTTP connection which is based on the channel list URL, without performing setting of an AVT instance.

[Server Having Multiple Tuners]

Figure 13:
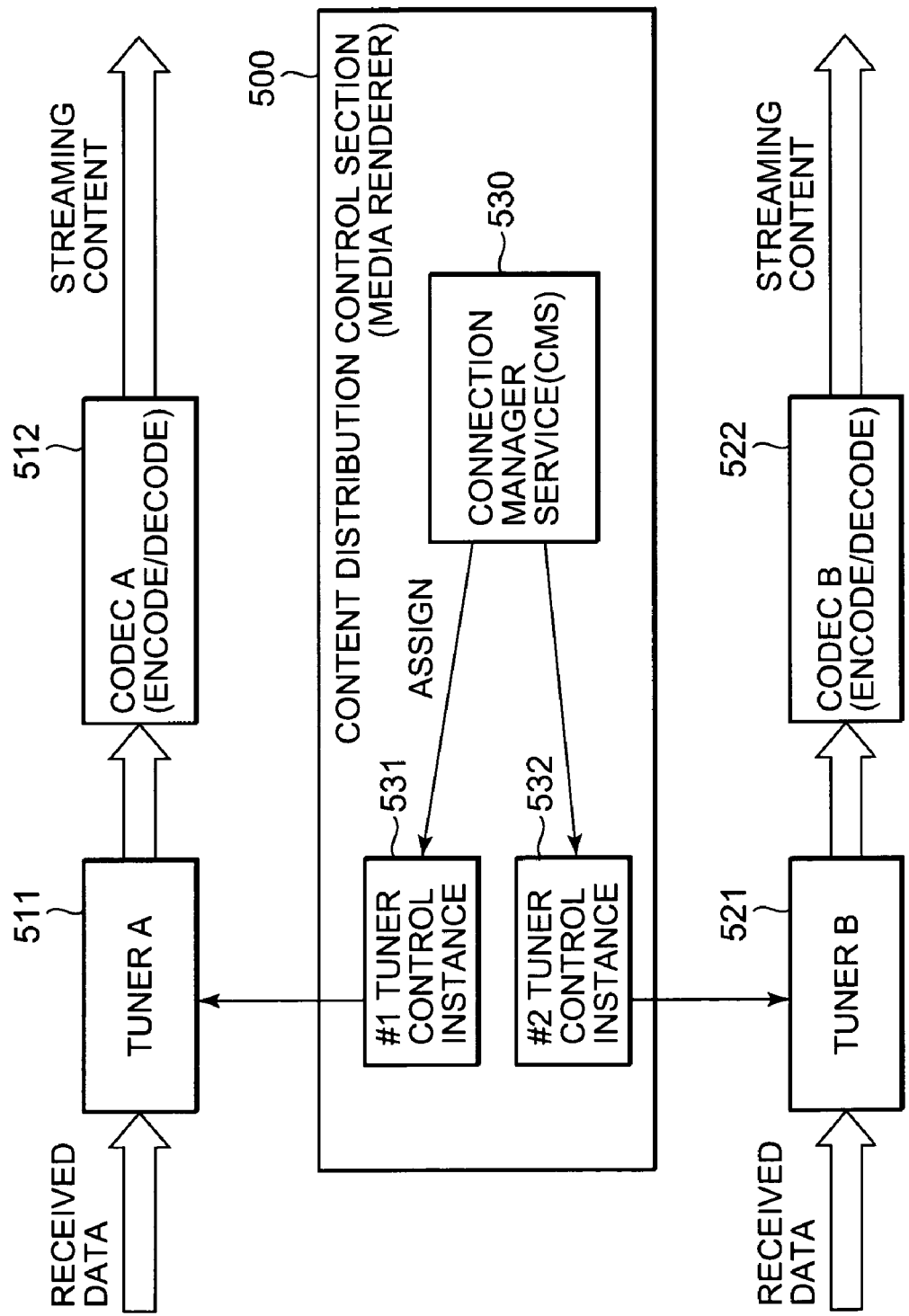
FIG. 13 is a diagram explaining a streaming distribution process on tuner-received data by a server having a plurality of tuners.
Figure 14:
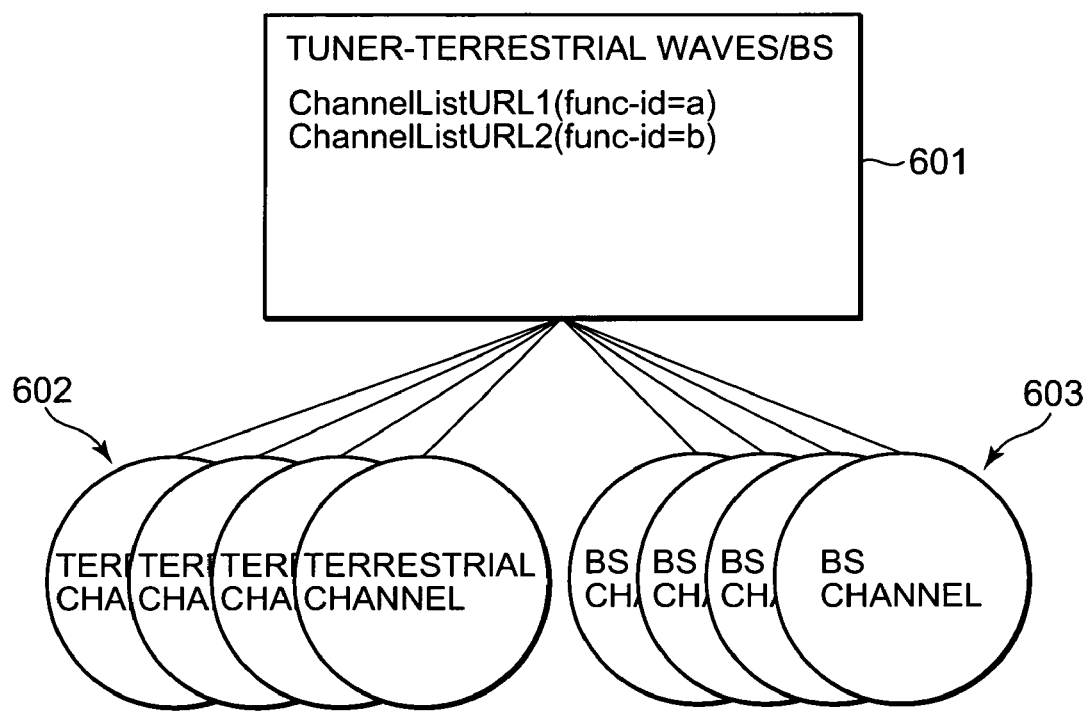
FIG. 14 is a diagram explaining an example correspondence between a tuner container and channel list URLs.

The above example deals with a server having only one tuner. A configuration in which multiple tuners are mounted on a server can also be implemented. In this case, channel URLs are associated with the respective tuners, and further, different AVT instances are individually set thereto to execute their control. A process in a server having two tuners is shown in FIG. 13.

In this case, single streaming content is transmitted to a client via a tuner A 511, a codec A 512, and further, another streaming content is transmitted to a client via a tuner B 521, a codec B 522.

A connection manager service 530 of a content distribution control section 500 assigns AVT instances for executing control over the respective tuners individually. A tuner control instance 531 executes control over the tuner A 511, and a tuner control instance 532 executes control over the tuner B 521.

In this case, a channel list URL set to the tuner control instance 531 is a channel list URL (A) corresponding to a tuner A container, and a channel list URL set to the tuner control instance 532 is a channel list URL (B) corresponding to a tuner B container.

Each of the clients receiving the content via the respective tuners has an AVT instance ID corresponding to the tuner control instance 531 or the tuner control instance 532, and can perform control designated by the corresponding AVT instance ID, whereby control can be implemented independently.

Note that association of the tuners with channel lists is determined by the channel list URLs set as metadata that are set so as to correspond to the tuner containers, as mentioned above. In the above-mentioned example, a case where a single channel list URL is associated with a single tuner has been described. However, where there are multiple tuners, there can be various modes for associating tuners with channel list URLs.

Where there are two tuners, and when each of the tuners can receive both terrestrial waves and BS waves, a single tuner container is set, and two channel list URLs can be set as metadata. To a tuner container 601, terrestrial channel items 602 and BS channel items 603 can be set as child items.

As metadata of the tuner container 601, two channel list URLs are set, which are a channel list URL 1 (funcID=a) and a channel list URL 2 (funcID=b).

In a case of such a configuration, the client can learn the two channel list URLs and their channel information as content information of the tuner container 601. When wishing to view a terrestrial channel, the client only has to select a channel list corresponding to the terrestrial waves, e.g., the channel list URL 1 (funcID=a) to execute the AVT instance setting process in step S107 in the processing sequence shown in FIG. 9. When wishing to view a BS channel, the client only has to select a channel list corresponding to the BS waves, e.g., the channel list URL 2 (funcID=b) to execute the AVT instance setting process in step S107 in the processing sequence shown in FIG. 9.

Note that in the case of such a configuration, as the protocol information transmitted from the connection manager service 431 of the content distribution control section 430 in step S103, the client is notified of two pieces of protocol information regarding streaming data content received via the two tuners, which are

[internal:1.2.3.4:application/x-av-tuner-content:func-id=a]

[internal:1.2.3.4:application/x-av-tuner-content:func-id=b]

corresponding to the function IDs of the above-mentioned two channel list URLs.

Figure 15:
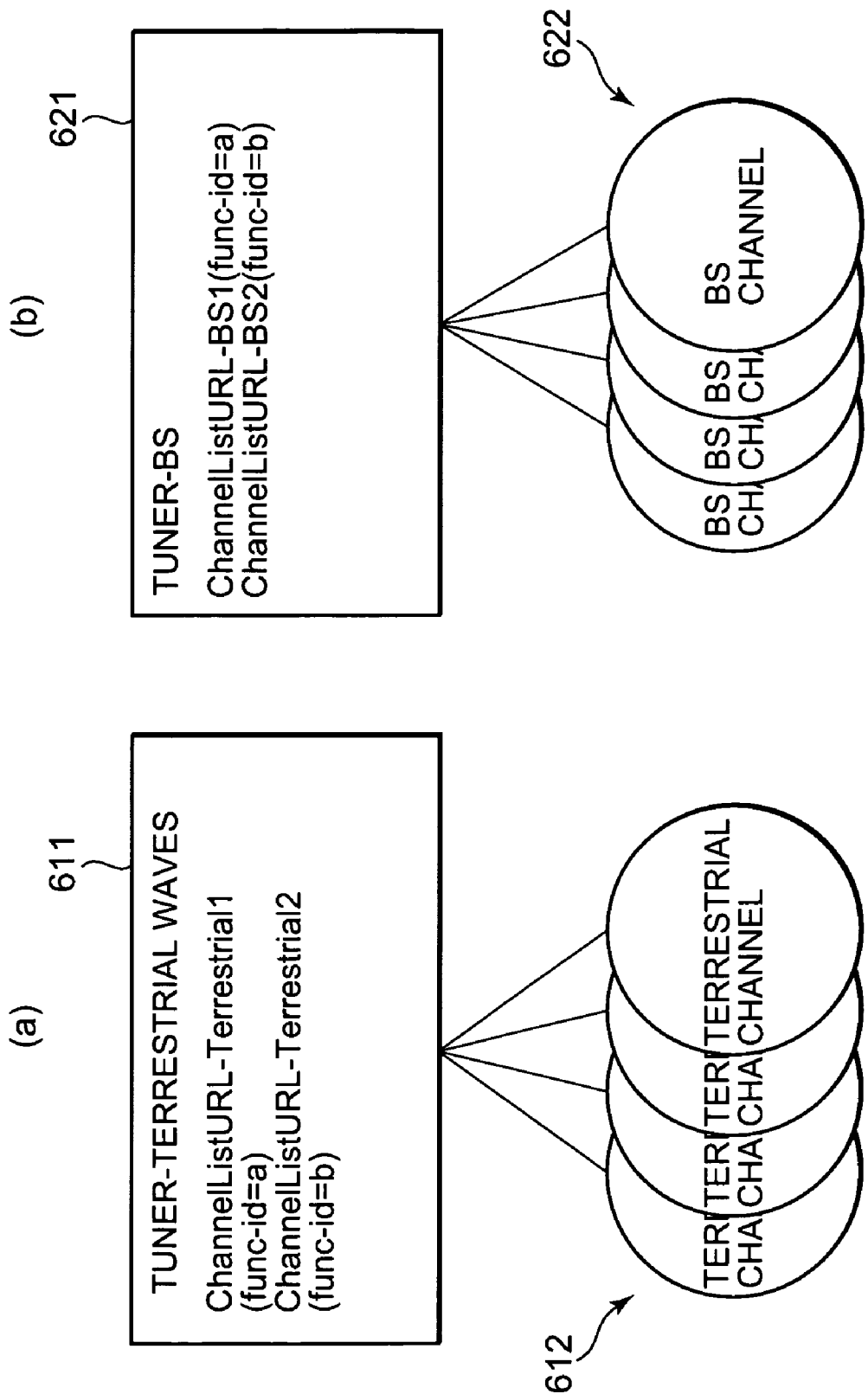
FIG. 15 is a diagram explaining an example correspondence between tuner containers and channel list URLs.

Further, where there are two terrestrial/BS dual-function receiving tuners, and when one is used exclusively for terrestrial waves and the other for BS waves, tuner containers 611, 621 are set as shown in FIG. 15. A plurality of terrestrial channel items 612 are set to the terrestrial tuner container 611. A plurality of BS channel items 622 are set to the BS tuner container 621.

Although only one channel list URL could be set to each of the tuner containers, two channel list URLs are set to each of the two tuner containers in an example shown in FIG. 15.

As a result of such a configuration, where a certain client is viewing a certain terrestrial channel by applying one tuner, another client can view another terrestrial channel by using the other tuner. Similarly, various types of viewing combinations, such as the clients viewing two different BS channels, respectively, or one viewing a terrestrial channel and the other viewing a BS channel, can be implemented.

Specifically, where two terrestrial channels are to be viewed via the two tuners, a channel list URL-Terrestrial 1 (funcID=a) and a channel list URL-Terrestrial 2 (funcID=b) in the terrestrial tuner container 611 are set to different AVT instances to allow them to perform control over the different tuners, respectively, whereby the two terrestrial channels can be transmitted to the respective clients.

Where two BS channels are to be viewed via the two tuners, a channel list URL-BS 1 (funcID=a) and a channel list URL-BS 2 (funcID=b) in the BS tuner container 621 are set to different AVT instances to allow them to perform control over the different tuners, respectively, whereby the two BS channels can be transmitted to the respective clients.

In a case of terrestrial and BS channels, control is performed by a combination of the channel list URL-Terrestrial 1 (funcID=a) in the terrestrial tuner container 611 and the channel list URL-BS 2 (funcID=b) in the BS tuner container 621, or a combination of the channel list URL-Terrestrial 2 (funcID=b) in the terrestrial tuner container 611 and the channel list URL-BS 1 (funcID=a) in the BS tuner container 621, whereby the terrestrial and BS content can be provided to the clients via the different tuners, respectively.

Figure 16:
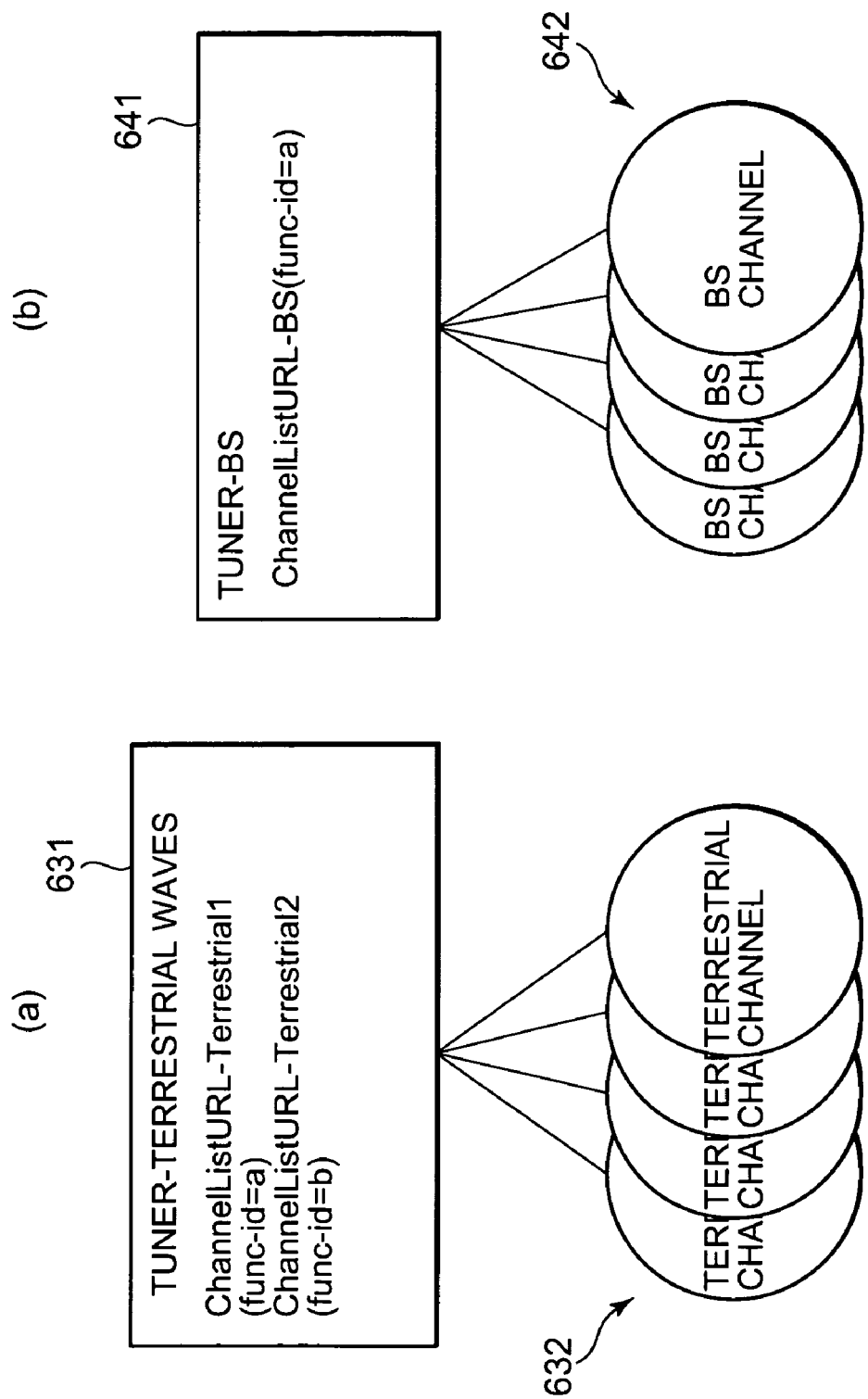
FIG. 16 is a diagram explaining an example correspondence between tuner containers and channel list URLs.

Further, of the two tuners, where one is dedicated to terrestrial waves, and the other is used as a terrestrial/BS dual-function tuner, channel list URLs such as shown in FIG. 16 can be set.

As shown in FIG. 16, tuner containers 631, 641 are set. A plurality of terrestrial channel items 632 are set to the terrestrial tuner container 631. A plurality of BS channel items 642 are set to the BS tuner container 631.

Two channel list URLs are set to the terrestrial tuner container 631, allowing the two channel list URLs to be applied simultaneously. This means that streaming distribution can be implemented simultaneously using the two tuners, only as to the terrestrial waves.

Specifically, where two terrestrial channels are to be viewed via the two tuners, a channel list URL-Terrestrial 1 (funcID=a) and a channel list URL-Terrestrial 2 (funcID=b) in the terrestrial tuner container 631 are set to different AVT instances to allow them to perform control over the different tuners, respectively, whereby the two terrestrial channels can be transmitted to the respective clients.

In a case of terrestrial and BS channels, control is performed by a combination of the channel list URL-Terrestrial 2 (funcID=b) in the terrestrial tuner container 631 and the channel list URL-BS (funcID=a) in the BS tuner container 641, whereby the terrestrial and BS content can be provided to the clients via the different tuners, respectively.

[Processing Flows of Server and Client]

Figure 17:
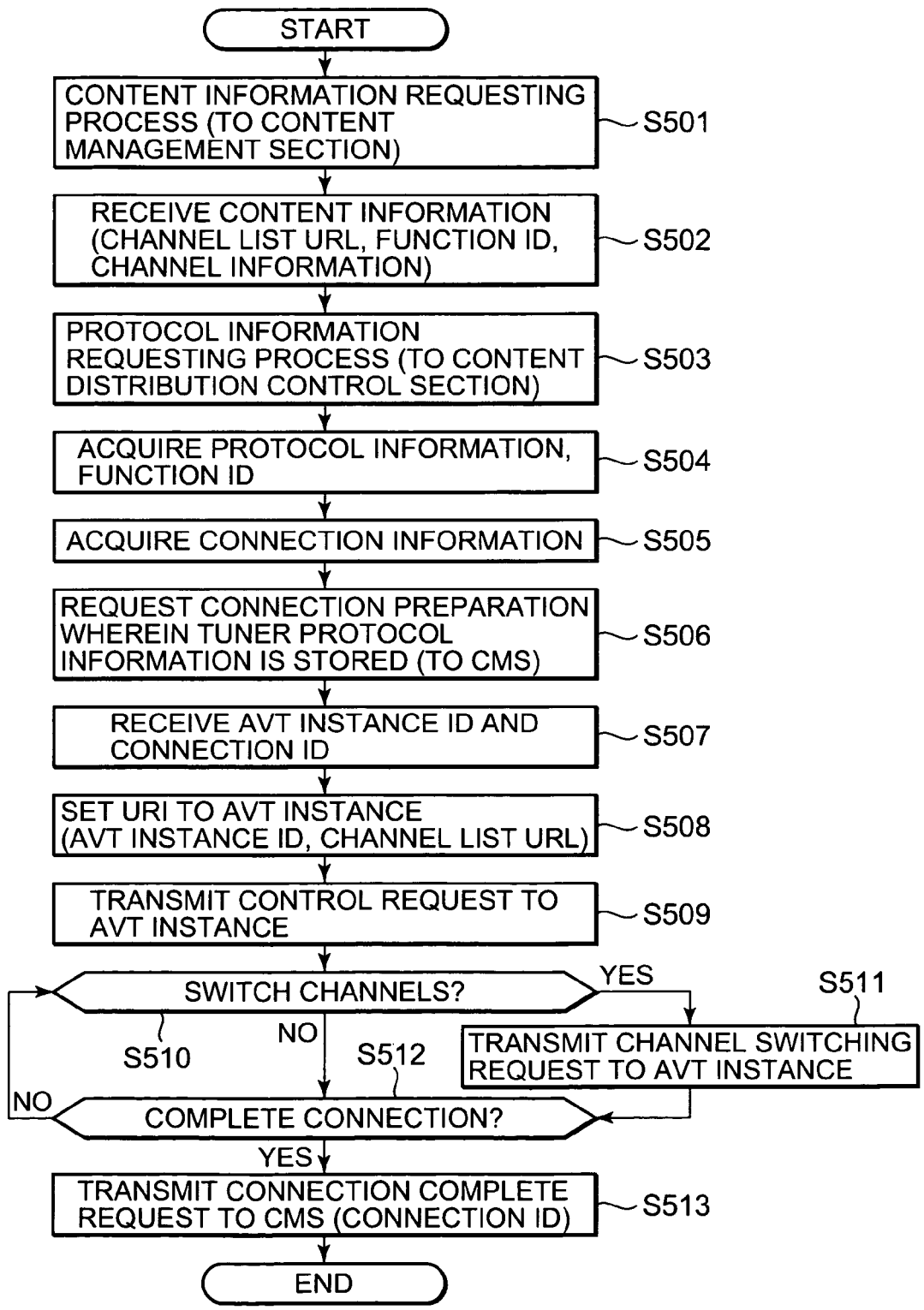
FIG. 17 is a flowchart explaining a process of the server that executes the streaming distribution process on tuner-received data.
Figure 18:
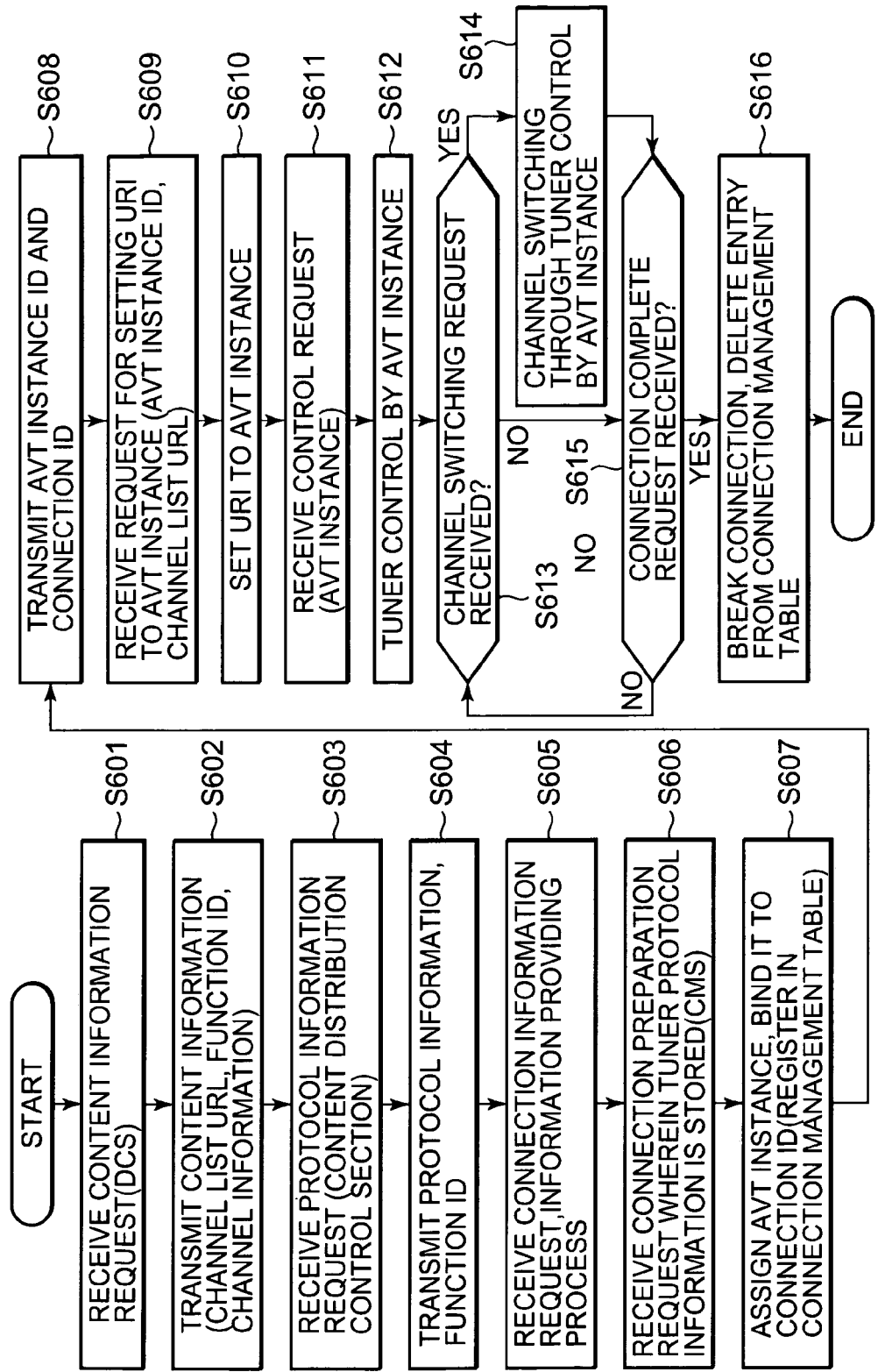
FIG. 18 is a flowchart explaining a process of the client that executes the streaming distribution process on tuner-received data.

Referring to flows of FIGS. 17 and 18, processing procedures of a server and a client in a live streaming process for tuner-received data will be described, respectively. First, a process on the part of the client will be described with reference to the processing flow of FIG. 17.

In step S501, a client apparatus executes requesting of content information acquisition through the "browsing" or "searching" process. This is executed to the content directory service 442 of the content management section 440 (see FIG. 6).

In step S502, the content information is received. Here, the content information about a tuner container and a channel item is to be acquired in order to execute streaming data distribution via a tuner. The content information corresponding to the tuner container shown in FIG. 8 (a), and information based on the channel-based content information shown in FIG. 8 (b) are acquired. As a result of this process, a channel list URL, a function ID, channel information are acquired.

Next in step S503, the client transmits a protocol information acquisition request to the connection manager service 431 of the content distribution control section 430. In step S504, the client receives a protocol information list from the connection manager service 431. This protocol information list contains protocol information [internal:1.2.3.4:application/x-av-tuner-content:func-id=t01] indicating that live streaming data can be distributed.

Next in step S505, the client acquires information regarding other clients currently connected to the server 400, from the connection manger service 431. In step S506, the client transmits a connection preparation request (PrepareForConnection) to the connection manager service 431. Where the client wishes distribution of tuner-applied live streaming data, the client transmits protocol information having a function ID that coincides with the function ID (funcID) contained in the content information corresponding to the tuner container received from the content directory service (CDS) 442 in step S502.

In step S507, the client receives a connection ID, and an identifier (AVT instance ID) of an AVT instance set (assigned) as a tuner control instance.

In step S508, the client issues a URI (Uniform Resource Identifier) setting request to the assigned AVT instance. The URI to be set to the AVT instance contains the AVT instance ID notified from the connection manager service 431, and the channel list URL contained in the content information corresponding to the tuner container acquired in step S502.

The processing up to this point is a setting process for allowing the AVT instance to perform tuner control. Thereafter, by issuing control requests to the AVT instance, the client can perform various control, such as transmission/stop of content, and channel switching.

In step S509, the client executes requesting of content control to the AVT instance. For example, a reproduction (Play) request, a channel switching (Seek) request are made. The client generates description data compliant with XML data, and transmits various control information to the AVT instance 433.

Where it is determined in step S510 that a user on the client side wishes to perform channel switching, the client issues a channel switching (Seek) request to the AVT instance in step S511. The AVT instance ID and a channel number for switching are stored into this control request. Where it is determined in step S512 that the connection is to be completed, the client transmits a connection complete request wherein the connection ID is stored, to the connection manager service 431. The connection ID is the one that has been received from the connection manager service 431 in step S507.

Referring next to the processing flow of FIG. 18, the process on the server side will be described. In step S601, the content directory service 442 of the content management section 440 (see FIG. 6) receives a content information acquisition request from the client. Here, it is assumed that a request for acquiring content information about a tuner container and a channel item has been made.

In step S602, the content directory service 442 transmits the content information about the tuner container and the channel item. The information includes the tuner container-corresponding content information shown in FIG. 8 (a) and the channel-based content information shown in FIG. 8 (b), containing a channel list URL, a function ID (funcID), channel information.

In step S603, the connection manager service 431 of the content distribution control section 430 of the server receives a protocol information acquisition request from the client. In step S604, the connection manager service 431 transmits a protocol information list to the client. The protocol information list transmitted to the client from the connection manager service 431 contains protocol information, which is [internal:1.2.3.4:application/x-av-tuner-content:func-id=t01] indicating that live streaming data can be distributed.

Next in step S605, the connection manager service 431 provides information regarding other clients currently connected to the server 400. The connection manager service 431 provides connection information on the basis of the connection management table shown in FIG. 10.

In step S606, the connection manager service 431 receives a connection preparation request (PrepareForConnection) from the client. Where the client desires tuner-applied distribution of live streaming data, the connection preparation request contains the function ID (funcID) contained in the content information corresponding to the tuner container as the content information already transmitted thereto from the content directory service (CDS) 442.

The connection manager service 431 having received the connection preparation request from the client judges that it is a request for streaming distribution of the received data by the tuner, on the basis of the protocol information [internal:1.2.3.4:application/x-av-tuner-content:func-id=t01] contained in the connection preparation request, and thus, in step S607, sets (assigns) one of AVT instances 433 in the content-handling control section 432 as a tuner control instance, performs a process of binding a connection ID to the client that has transmitted the connection preparation request, to an identifier (AVT instance ID) of the AVT instance set (assigned) as the tuner control instance, i.e., associating the former with the latter, and sets an entry to the connection management table shown in FIG. 10. In step S608, the connection manager service 431 notifies the client of the connection ID and the AVT instance ID.

In step S609, when the AVT instance receives a URI (Uniform Resource Identifier) setting request from the client, the AVT instance ID and the channel list URL are set to the AVT instance as the an AVT instance URI, in step S610.

The AVT instance can now identify content and a client which it is to control on the basis of the client-designated AVT instance ID and channel list URL. That is, the AVT instance recognizes the client that transmits various control instructions by designating the AVT instance ID, as a client corresponding to the AVT instance, and identifies a tuner associated by the channel list URL as a controlled object. The channel list URL is content corresponding to the tuner container, and the AVT instance wherein the channel list URL is set is to be set as an instance that executes control over the tuner 410.

Next in step S611, when the AVT instance receives a content control request, the AVT instance 433 executes processing, such as tuner control which is based on the information received from the client, e.g., content reproduction start/end, and channel switching, in step S612. The AVT instance 433 specifies content for control on the basis of a set content URL, and controls that specified content for control. In this case, the content URL is a channel list URL, and the channel list URL is the content information corresponding to the tuner container, and thus the AVT instance 433 executes control over the tuner 410.

When it is determined in step S613 that a channel switching (Seek) request has been received, the AVT instance 433 controls the tuner 410 to switch channels on the tuner, in step S614. The HTTP connection between the server and the client before and after this channel switching is an HTTP connection which is based on the same URL, i.e., the same channel list URL, and thus, the channel switching is executed with the connection maintained between the server and the client.

Where it is determined in step S615 that the connection manager service 431 has received a connection complete request wherein the connection ID is stored, it breaks the connection between the server and the client according to the request from the client, and further, deletes the corresponding entry from the connection management table described with reference to FIG. 10, in step S616.

Note that as mentioned above, where image or audio data for transmission to the client from the server is converted into coded data, such as, e.g., MPEG data, unconditional execution of switching of the data for transmission on the basis of a channel switching timing received from the client may cause unmatching of coded data packets for transmission in some cases. For example, during transmission of a part of PES (Packetized Elementary Stream) packets which are packets forming a pack (Pack) specified in, e.g., the MPEG-2 system, when channel switching is executed to change the data for transmission, some dropout occurs in a pack (Pack) which is a processing unit for decoding on the part of the client, causing reproduction error.

Therefore, where it is determined in step S613 that the server has received a channel switching (Seek) request, the server determines whether or not matching of the coded data for transmission can be maintained even when the data for transmission is changed on the basis of the channel switching request from the client. If it is determined that the matching cannot be maintained, the server breaks the "connection" connection for distribution of data streams between the server and the client, i.e., the HTTP connection which is based on the channel URL, before executing the channel switching that is performed by the AVT instance 433 controlling the tuner 410 in step S614, and then executes a process of notifying the client that the "connection" connection for distribution of data streams has been broken, via a connection for event notification, after which the server executes the channel switching through the control over the tuner 410 by the AVT instance 433, in step S614.

Where the client receives a connection breakage notice from the server, the client performs a process of setting the HTTP connection which is based on the channel list URL again; i.e., it transmits an HTTP-GET method which is based on the channel list URL, to the server. Note that the setting status of the AVT instance (tuner control instance 433) is maintained, and thus setting processing, such as assigning anew a tuner control instance 433, setting a URI can be omitted.

Note that it may otherwise be configured such that, as mentioned above, the server detects a data encoding situation in the codec 420, and inputs the detected information to the tuner control instance 433 to execute channel switching on the tuner 410 under the timing control by the tuner control instance 433. In this case, the tuner control instance 433 executes the channel switching under the control over the tuner 410 by the AVT instance (tuner control instance 433) in step S614, at such a timing when matching of the coded data for transmission to the client can be maintained, on the basis of the detected information about the data encoding situation in the codec 420, after having received the channel switching (Seek) request in step S613.

By the server side executing such control over the channel switching timing, occurrence of decoding error can be prevented on the client side, and thus the client side can execute reproduction of the data before and after the channel switching normally.

[Functional Configuration of Server and Client]

The hardware configurations of the server and the client apparatus are as described above with reference to FIG. 2 above. The above-mentioned various processes, e.g., the processes described with reference to the flows of FIGS. 17, 18 are executed mainly under the control of the CPUs according to programs stored in the respective storage sections of the server and the client. A functional configuration of the server and a functional configuration of the client which are required to execute the above-mentioned processes will be described with reference to FIGS. 19 and 20.

FIG. 19 is a block diagram showing a major functional configuration of the server. While basically corresponding to the configuration shown in FIG. 6, the configuration of FIG. 19 shows an example in which the server has two tuners. A packet transmission/reception section 701 receives packets to and from a client. A packet generation/analysis section 702 performs a process of generating packets for transmission, and a process of analyzing packets received. The processes include addressing, address recognition of a packet, storing of data into or acquiring of data from a data section.

A tuner A 703 and a tuner B 704 are tuners that receive data via terrestrial broadcasting, satellite broadcasting such as BS, CS, the Internet, and other communication networks.

A content storage section 705 stores content held by the server. Each item of the content can be specified by a content URL. An event information storage section 706 stores event information corresponding to the content. Each piece of the event information can be specified by an event URL.

A codec 707 converts the content held by the server, tuner-received content into a data mode corresponding to a request from a client. It executes conversion of file formats, codec, resolutions, and the like. For example, it executes data conversion based on ATRAC3, MPEG4.

A content management section is a processing section that executes content management, and a metadata storage section 713 is a storage section in which metadata as attribute information corresponding to the content is stored. As mentioned above, the metadata storage section 713 stores property information that constitutes metadata corresponding to objects rendered by containers and the like. For example, as property information about a tuner container, a channel list URL is set. A connection manager service 711 generates content information on the basis of the metadata according to a content information request from a client. The connection manager service 711 manages connections with a client in the content management section, and provides the client with protocol information and the like that can be processed in the content management section.

A content distribution control section 720 executes control over content for distribution to a client, and has a connection manager service 721 and a content-handling control section 722. AVT instances 723 are set to the content-handling control section 722, and specific distribution control over content is executed by an AVT instance corresponding to each content.

The connection manager service 721 assigns an AVT instance, and sets a connection management table (see FIG. 10) that manages connection IDs, AVT instance IDs, protocol information by association with each other, to perform connection management.

Referring next to FIG. 20, a functional configuration of the client apparatus will be described. A packet transmission/reception section 801 receives packets to and from the server. A packet generation/analysis section 802 performs a process of generating packets for transmission and a process of analyzing packets received. Not only analysis of data stored into a packet, but also addressing, address recognition of a packet, storing of data into and acquiring of data from a data section, and the like are included.

A storage section 803 stores content information, content, channel information, channel list URLs, function IDs, event information, connection IDs, AVT instance IDs, and the like therein.

An output section 804 includes speakers, a display to be applied to a content reproduction process. Note that the display is also used for output of the display information described with reference to FIG. 4 above. An input section 805 includes means such as a keyboard, and other data input means for executing user input, such as selection of a channel list as content information displayed as display information, channel selection which is based on the channel information, and the like.

A content information analysis section 806 analyzes XML data formed from content information received from the server, generates the display information containing a content URL, a channel list URL described with reference to FIG. 4 above, or their link data, on the basis of the analyzed data, and executes a process of outputting them on the display as the output section.

A content reproduction control section 807 executes reproduction control over content received from the server. Note that in the content reproduction process, a process of converting the content received from the server is executed in a data conversion section 808, as necessary. For example, it executes a data decoding process and the like which is based on ATRAC3, MPEG4.

The server and the client functionally have the respective functions shown in FIGS. 19, 20, and execute the above-mentioned respective processes. However, the block diagrams shown in FIGS. 19, 20 are block diagrams explaining the functions, and thus, in actuality, various processing programs are executed under the control of the CPU in the hardware configuration of the PC or the like shown in FIG. 2.

The present invention has been described in great detail with reference to a specific embodiment in the foregoing. However, it is obvious that those skilled in the art can make modifications to or substitutions for the embodiment without departing from the scope and spirit of the present invention. That is, the present invention has been disclosed by way of examples, and thus should not be construed in a restrictive sense. In order to judge the scope and spirit of the present invention, the appended claims should be taken into consideration.

Note that a series of processes described in the description can be performed by hardware, or software, or a configuration having both combined. In a case of performing the processes depending on software, the processes can be performed by installing a program having recorded processing sequences therein to a memory within a computer incorporated into dedicated hardware, for execution, or by installing the program into a general-purpose computer that can perform various processing, for execution.

For example, the program can be recorded on a hard disk and a ROM (Read Only Memory) as recording media beforehand. Alternatively, the program can be stored (recorded) temporarily or permanently on a removable recording medium, such as a flexible disk, a CD-ROM (Compact Disc Read Only Memory), a MO (Magneto optical) disc, a DVD (Digital Versatile Disc), a magnetic disk, a semiconductor memory. Such a removable recording medium can be provided as so-called package software.

Note that the program can be installed to the computer from a removable recording medium such as mentioned above, and additionally, through wireless transmission to the computer from a download site, wired transmission to the computer via a network such as a LAN, the Internet to allow the computer to receive the thus transmitted program for installation in a storage medium such as a hard disk incorporated therein.

Note that the various processes described in the description are performed not only time-sequentially according to what has been described, but also parallelly or individually according to the processing capacity of an apparatus that performs a process, or as necessary. Further, the system used in the present description means a logical set configuration of a plurality of apparatus, and is not limited to one wherein apparatus each having its own configuration are grouped within the same enclosure.

INDUSTRIAL APPLICABILITY

According to the configuration of the present invention, it is configured to set a URL to a channel list as a set of channels, and a client transmits a content acquisition request wherein the channel list URL is designated, to a server, whereby the client can collectively obtain rights to control all content on the channels listed in the channel list, i.e., channel items set below a tuner container in a content management directory. As a result, when channels listed in the channel list are to be switched, there is no need to make a content request which is based on a new URL.

Further, in the configuration of the present invention, content distribution which continuously uses an HTTP connection set on the basis of the channel list can be executed before and after channel switching executed as switching of a plurality of tuner-received content corresponding to a plurality of channels described in the channel list. Therefore, the client can switch channels only by transmitting a control instruction, such as a channel switching instruction, to the content distribution control section. Consequently, processing, such as re-setting of the connection between the server and the client which is based on switching of new/old URLs, is no longer required. That is, when channels in the channel list are to be switched, content can be received before and after the channel switching, while continuously using the HTTP connection as a content distribution connection, only by performing a channel switching request (AVT Seek action) to an AVT instance.

Furthermore, in the configuration of the present invention, where an HTTP-GET method as a content request from another client wherein the same channel list URL is designated is received during execution of distribution control over content of a plurality of channels received by a tuner specified on the basis of a channel list URL as an identifier of a channel list under the control of an AVT instance, that requesting client can execute distribution of tuner-received content specified on the basis of the channel list URL, through an HTTP connection which is based on the channel list URL, without setting an AVT instance.

The invention claimed is:

1. A content providing server that executes a content transmission process to a client connected via a local area network, comprising:
   a tuner that receives content over channels;
   a data transmission/reception section that executes a communication process between the server and the client via the local area network for the content and control information;
   a storage section having attribute information corresponding to the content as content information;
   a content management section providing the content information to the client; and
   a content distribution control section that executes live streaming of the content to the client via the local area network,
   wherein the storage section stores a first channel list including the channels, and
   wherein the content distribution control section streams the content, corresponding to the channels, the content being simultaneously streamed over a single connection as a single unit of controlled content, the single unit of streamed content being represented by a single URL (Uniform Resource Locator) and being streamed on the basis of a control request corresponding to a second channel list received from the client.

2. The content providing server as described in claim 1, wherein:
   the first channel list comprises a plurality of URLs (Uniform Resource Locators) including the single URL;
   the second channel list comprises the single URL;
   the storage section is configured to store the URLs as attribute information corresponding to the content; and
   the content distribution control section is configured to stream the content on the basis of the single URL, according to the control request from the client.

3. The content providing server as described in claim 1, wherein:
   the first channel list comprises a plurality of URLs (Uniform Resource Locators) including the single URL;
   the second channel list comprises the single URL;
   a connection for streaming of the content between the server and the client is an HTTP (HyperText Transport Protocol) connection set on the basis of the single URL; and
   the content distribution control section streams the content via the HTTP connection before and after channel switching, wherein the channel switching comprises switching between the channels described in the second channel list.

4. The content providing server as described in claim 1, wherein:
   the content information contains protocol information comprising a function ID, as tuner identification information, corresponding to the tuner; and
   the content distribution control section is configured to set a control instance that executes control over the content, by executing control over the tuner based on the function ID.

5. The content providing server as described in claim 1, wherein:
   the content distribution control section sets a control instance to execute control for streaming content; and
   a tuner control instance executes control over the content by controlling the tuner on the basis of the control request from the client.

6. The content providing server as described in claim 1, wherein:
   the content distribution control section is configured to:
      set a control instance to execute control for streaming content; and
      execute connection management based on a connection management table comprising an instance ID as an identifier of the control instance, a connection ID as a connection identifier between the server and the client, and protocol information corresponding to the content.

7. The content providing server as described in claim 1, wherein:
   the content distribution control section is configured to:
      set a control instance for streaming content, wherein the control instance is configured to have an instance ID set as an identifier; and
      execute the content distribution control according to a control request from the client, wherein the client request designates the control instance ID.

8. The content providing server as described in claim 1, wherein:
   the content distribution control section is configured to:
      receive a control request from the client, for streaming the content, wherein the control request is compliant with a SOAP (Simple Object Access Protocol); and
      execute distribution control over the content on the basis of the control request.

9. The content providing server as described in claim 1, wherein:
   the first channel list is configured to be set as a list formed from the channels divided according to categories.

10. The content providing server as described in claim 1, wherein:
   the content distribution control section is configured to:
      set the single URL as an identifier for the second channel list;
      receive an HTTP-GET method as a content request from another client, the request invoking the URL; and
      stream, through an HTTP connection, content based on the single URL invoked by the client.

11. The content providing server as described in claim 1, wherein:
   the first channel list comprises a plurality of URLs (Uniform Resource Locators) including the single URL;
   the second channel list comprises the single URL;
   a connection for streaming of the content between the server and the client is an HTTP (HyperText Transfer Protocol) connection, wherein the connection is set on the basis of the single URL;
   the content distribution control section is configured to:
      determine whether or not streaming to the client can be maintained even when there is switching between the channels described in the second channel list; and execute breakage of the HTTP connection where it is determined that the streaming cannot be maintained; and the content providing server is configured to notify breakage information about the HTTP connection, via an event notification connection between the server and the client.

12. The content providing server as described in claim 1, wherein:

the first channel list comprises a plurality of URLs (Uniform Resource Locators) including the single URL;

the second channel list comprises the single URL;

a connection for streaming of the content between the server and the client is an HTTP (HyperText Transport Protocol) connection set on the basis of the single URL; and the content distribution control section is configured to execute switching between the channels described in the second channel list by controlling the tuner at a timing when streaming, of the channels, to the client can be maintained.

13. An information processing apparatus that receives content from a tuner set in a server via a local area network, comprising:

a data transmission/reception section that executes data transmission/reception process with respect to the server that provides content via the local area network, wherein the tuner receives the content over channels and the server stores a first channel list including the channels; and a control section configured to:

transmit to the server, via the local area network, a content transmission request including a second channel list, the second channel list including a plurality of the channels included in the first channel list; and transmit a distribution control request for the content, wherein the server designates a control instance that executes control over content streaming, wherein the data transmission/reception section receives content corresponding to the channels as a single unit of controlled content, the single unit of controlled content being streamed over a single connection as a single unit of streamed content represented by a single URL (Uniform Resource Locator).

14. The information processing apparatus as described in claim 13, wherein:

the control section is configured to:

transmit a connection preparation request, to the server, to acquire an ID of the control instance, wherein the ID comprises a tuner identification function ID based on protocol information stored in the server; and transmit the distribution control request for the content, wherein the acquired control instance ID is included in the distribution control request.

15. The information processing apparatus as described in claim 13, wherein:

the first channel list comprises a plurality of URLs (Uniform Resource Locators) including the single URL;

the second channel list comprises the single URL;

a connection for streaming of the content between the server and the client is an HTTP (HyperText Transport Protocol) connection set on the basis of the single URL; and the control section executes content reception before and after switching between the plurality of channels described in the second channel list by using the HTTP connection.

16. A content transmission control method for transmitting content from a tuner, set in a server, to a client via a local area network, wherein the tuner receives the content over channels and the server stores a first channel list including the channels, comprising:

setting a control instance, wherein content corresponding to channels in a second channel list is set as a unit of content to execute control over streaming of the content corresponding to the second channel list;

receiving a control request, designating the control instance, from the client via the local area network;

controlling the tuner by using the control instance designated in the control request; and streaming the unit of content based on the control request, wherein the unit of content is streamed over a single connection and the streamed unit of content is represented by a single URL (Uniform Resource Locator).

17. The content transmission control method as described in claim 16, wherein:

the first channel list comprises a plurality of URLs (Uniform Resource Locators) including the single URL;

the second channel list comprises the single URL; and setting the control instance further comprises associating the single URL with the control instance.

18. The content transmission control method as described in claim 16, wherein:

the first channel list comprises a plurality or URLs (Uniform Resource Locators) including the single URL;

the second channel list comprises the single URL;

a connection for streaming of the content between the server and the client is an HTTP (HyperText Transfer Protocol) connection set on the basis of the single URL; and setting the control instance further comprises content streaming using the HTTP connection, wherein the content streaming is executed before and after switching between the channels described in the second channel list.

19. The content transmission control method as described in claim 16, wherein:

the content information contains protocol information corresponding to the content, the protocol information containing a function ID as tuner identification information; and setting the control instance further comprises controlling the tuner on the basis of the function ID.

20. The content transmission control method as described in claim 16, wherein:

the content transmission control method further comprises executing connection management based on a connection management table comprising an instance ID as an identifier of the control instance, a connection ID as a connection identifier between the server and the client, and protocol information corresponding to the content.

21. The content transmission control method as described in claim 16, wherein:

receiving the control request further comprises receiving a request for streaming content compliant with a SOAP (Simple Object Access Protocol).

22. The content transmission control method as described in claim 16, further comprising:

setting the single URL as an identifier for the second channel list;

receiving an HTTP-GET method as a content request from another client, the request invoking the single URL; and streaming, through an HTTP connection, content based on the URL invoked by the client.

23. The content transmission control method as described in claim 16, wherein:
- the first channel list comprises a plurality of URLs (Uniform Resource Locators) including the single URL;
- the second channels list comprises the single URL;
- a connection for streaming of the content is an HTTP (HyperText Transfer Protocol) connection set on the basis of the single URL; and
- content transmission control method further comprises:
  - determining whether or not streaming of the content, to the client can be maintained even when there is switching between the channels described in the second channel list;
  - executing breakage of the HTTP connection where it is determined that the streaming cannot be maintained; and
  - notifying breakage information about the HTTP connection via an event notification connection between the server and the client.

24. The content transmission control method as described in claim 16, wherein:
- the first channel list comprises a plurality of URLs(Uniform Resource Locators) including the single URL;
- the second channel list comprises the single URL;
- a connection for streaming of the content is an HTTP (HyperText Transfer Protocol) connection set on the basis of the single URL; and
- executing switching between the channels described in the second channel list by controlling the tuner at a timing when streaming of the content, to the client, can be maintained.

25. An information processing method for receiving content from a tuner set in a server via a local area network, wherein the tuner receives the content over channels and the server stores a first channel list including the channels, comprising:
- transmitting a content transmission request including a second channel list, the second channel list including a plurality of the channels included in the first channel list;
- transmitting via the local area network a distribution control request for the content, wherein the server designates a control instance that executes control over content distribution; and
- receiving content corresponding to the channels as a single unit of controlled content, wherein the single unit of controlled content is streamed over a single connection as a single unit of streamed content represented by a single URL (Uniform Resource Locator).

26. The information processing method as described in claim 25, further comprising:
- transmitting a connection preparation request, to the server, to acquire an ID of the control instance, wherein the ID comprises a tuner identification function ID based on protocol information stored in the server; and
- transmitting a distribution control request for the content, wherein the acquired control instance ID is included in the distribution control request.

27. The information processing method as described in claim 25, wherein:
- the first channel list comprises a plurality of URLs (Uniform Resource Locators) including the single URL;
- the second channel list comprises the single URL;
- a connection for streaming of the content is an HTTP (HyperText Transfer Protocol) connection set on the basis of the single URL; and
- executing content reception before and after switching between the plurality of channels described in the second channel list by using the HTTP connection.

28. A computer-readable storage medium comprising a computer program which when executed on a processor, causes the processor to perform a method, the method comprising:
- transmitting content from a tuner, set in a server, to a client via a local area network, wherein the tuner receives the content over channels and the server stores a first channel list including the channels;
- setting a control instance, wherein content corresponding to channels in a second channel list is set as a unit of content to execute control over streaming of the content corresponding to the second channel list;
- receiving a control request, designating the control instance, from the client via the local area network; and
- controlling the tuner by using the control instance designated in the control request,
- wherein the content is transmitted by streaming the unit of content, over a single connection, based on the control request, the unit of streamed content being represented by a single URL (Uniform Resource Locator).

29. A computer-readable storage medium comprising a computer program which when executed on a processor, causes the processor to perform a method, the method comprising:
- receiving content from a tuner set in a server, via a local area network, wherein the tuner receives the content over channels and the server stores a first channel list including the channels;
- transmitting a content transmission request including a second channel list, the second channel list including a plurality of the channels included in the first channel list; and
- transmitting, via the local area network, a distribution control request for the content, wherein a control instance that executes control over content streaming is designated in the server,
- wherein the content is received when the tuner streams content corresponding to the channels as a single unit of content, the single unit of streamed content being represented by a single URL (Uniform Resource Locator) and being streamed over a single connection.

* * * * *